United States Patent
Salter et al.

(10) Patent No.: US 12,491,838 B2
(45) Date of Patent: Dec. 9, 2025

(54) REMOVABLE STEERING WHEELS OF VEHICLES AND RELATED METHODS

(71) Applicant: Ford Global Technologies, LLC, Dearborn, MI (US)

(72) Inventors: Stuart C. Salter, White Lake, MI (US); Christian Lange, Berkley, MI (US); Michael Kowalski, Dearborn, MI (US); Miguel Angel Bahena, Saline, MI (US); Brendan Diamond, Grosse Pointe, MI (US); Nir Siegel, Raananna (IL)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 18/439,121

(22) Filed: Feb. 12, 2024

(65) Prior Publication Data
US 2025/0256680 A1    Aug. 14, 2025

(51) Int. Cl.
| | | |
|---|---|---|
| *B60R 25/022* | (2013.01) | |
| *B60R 25/0215* | (2013.01) | |
| *B60R 25/25* | (2013.01) | |
| *B62D 1/04* | (2006.01) | |
| *B62D 1/28* | (2006.01) | |
| *B62D 5/04* | (2006.01) | |
| *E05B 81/08* | (2014.01) | |

(52) U.S. Cl.
CPC ........ *B60R 25/022* (2013.01); *B60R 25/0215* (2013.01); *B60R 25/252* (2013.01); *B60R 25/255* (2013.01); *B60R 25/257* (2013.01); *B62D 1/04* (2013.01); *B62D 1/283* (2013.01); *B62D 5/0481* (2013.01); *E05B 81/08* (2013.01)

(58) Field of Classification Search
CPC . B60R 25/022; B60R 25/0215; B60R 25/252; B60R 25/255; B60R 25/257; B62D 5/0481; E05B 81/08
USPC .......................................... 701/41, 42, 43, 44
See application file for complete search history.

(56) References Cited

U.S. PATENT DOCUMENTS

| | | |
|---|---|---|
| 9,840,279 B2 | 12/2017 | Abbas et al. |
| 9,963,035 B2 | 5/2018 | El Aile et al. |
| (Continued) | | |

FOREIGN PATENT DOCUMENTS

| | | |
|---|---|---|
| GB | 2550656 A | 11/2017 |
| KR | 19980050887 A | 9/1998 |

OTHER PUBLICATIONS

Speedway Motors, "Pin-Style Quick Release Steel Steering Wheel Hub, ⅝ Inch Steel Shaft," retrieved from https://www.speedwaymotors.com/Pin-Style-Quick-Release-Steel-Steering-Wheel-Hub-5-8-Inch-Steel-Shaft,29131.html on Sep. 17, 2023, 5 pages.

*Primary Examiner* — Hai H Huynh
(74) *Attorney, Agent, or Firm* — Lorne Forsythe; Hanley, Flight & Zimmerman

(57) ABSTRACT

Systems, apparatus, articles of manufacture, and methods are disclosed to remove a steering wheel of a vehicle. As disclosed herein, a non-transitory computer-readable medium comprising instructions which, when executed, cause processor circuitry of a vehicle to: detect a request to remove a steering wheel from a steering system of a vehicle; verify a user identity based on a user profile, the user profile stored in a memory associated with the vehicle; determine whether a disengagement criterion is satisfied; and after the user identity is detected and the disengagement criterion is satisfied, disengage a lock to enable removal of the steering wheel from the steering system of the vehicle.

20 Claims, 14 Drawing Sheets

(56) References Cited

U.S. PATENT DOCUMENTS

| | | |
|---|---|---|
| 10,571,907 B2 | 2/2020 | Buttolo et al. |
| 10,710,627 B2 | 7/2020 | Kreutz et al. |
| 10,716,999 B2 | 7/2020 | Jaouen |
| 2015/0120089 A1 | 4/2015 | Peel et al. |
| 2018/0085664 A1 | 3/2018 | Champagne et al. |
| 2018/0143754 A1 | 5/2018 | Niazi |
| 2023/0024039 A1 | 1/2023 | Shaughnessy et al. |

REMOVABLE STEERING WHEELS OF VEHICLES AND RELATED METHODS

FIELD OF THE DISCLOSURE

This disclosure relates generally to removable steering wheels and, more particularly, to removable steering wheels of vehicles and related methods.

BACKGROUND

A steering wheel is configured to change a driving direction of a vehicle based on a rotation of the steering wheel. For example, a driver rotating the wheel in a given direction causes a system of pivoted joints to interact, thereby transferring the rotational motion of the steering wheel into a pivoting motion of one or more road wheels. Known steering systems include rack and pinion systems. The rack and pinion systems rely on a gear wheel (e.g., a pinion) at the base of the steering column hub that causes a rack to translate from side to side, propagating the motion to the road wheels.

SUMMARY

An example method to remove a steering wheel of a vehicle disclosed herein includes: detecting a request to remove a steering wheel from a steering system of a vehicle; verifying a user identity based on a user profile, the user profile stored in a memory associated with the vehicle; determining whether a disengagement criterion is satisfied; and after the user identity is verified and the disengagement criterion is satisfied, disengaging a lock to enable removal of the steering wheel from the steering system of the vehicle.

An example non-transitory computer-readable medium disclosed herein includes instructions which, when executed, cause processor circuitry of a vehicle to: detect a request to remove a steering wheel from a steering system of a vehicle; verify a user identity based on a user profile, the user profile stored in a memory associated with the vehicle; determine whether a disengagement criterion is satisfied; and after the user identity is detected and the disengagement criterion is satisfied, disengage a lock to enable removal of the steering wheel from the steering system of the vehicle.

An example steering wheel system to remove a steering wheel of a vehicle disclosed herein includes a steering wheel shaft including a first opening; a steering wheel coupled to a steering wheel shaft; a steering column hub including a second opening; a first sensor located on at least one of the steering wheel shaft or the steering column hub; a second sensor located on at least one of the steering wheel shaft or the steering column hub; an electronic lock to couple the steering wheel shaft to the steering column hub, the electronic lock moveable between a closed position and an open position, the electronic lock including a pin, the pin to extend through the first opening and the second opening in the closed position; and circuitry to: determine the first opening is aligned with the second opening based on a first output of the first sensor and a second output of the second sensor; and move the electronic lock to the closed position after determining the first opening is aligned with the second opening.

BRIEF DESCRIPTION OF THE DRAWINGS

In general, the same reference numbers will be used throughout the drawing(s) and accompanying written description to refer to the same or like parts. The figures are not necessarily to scale.

Figure 1:
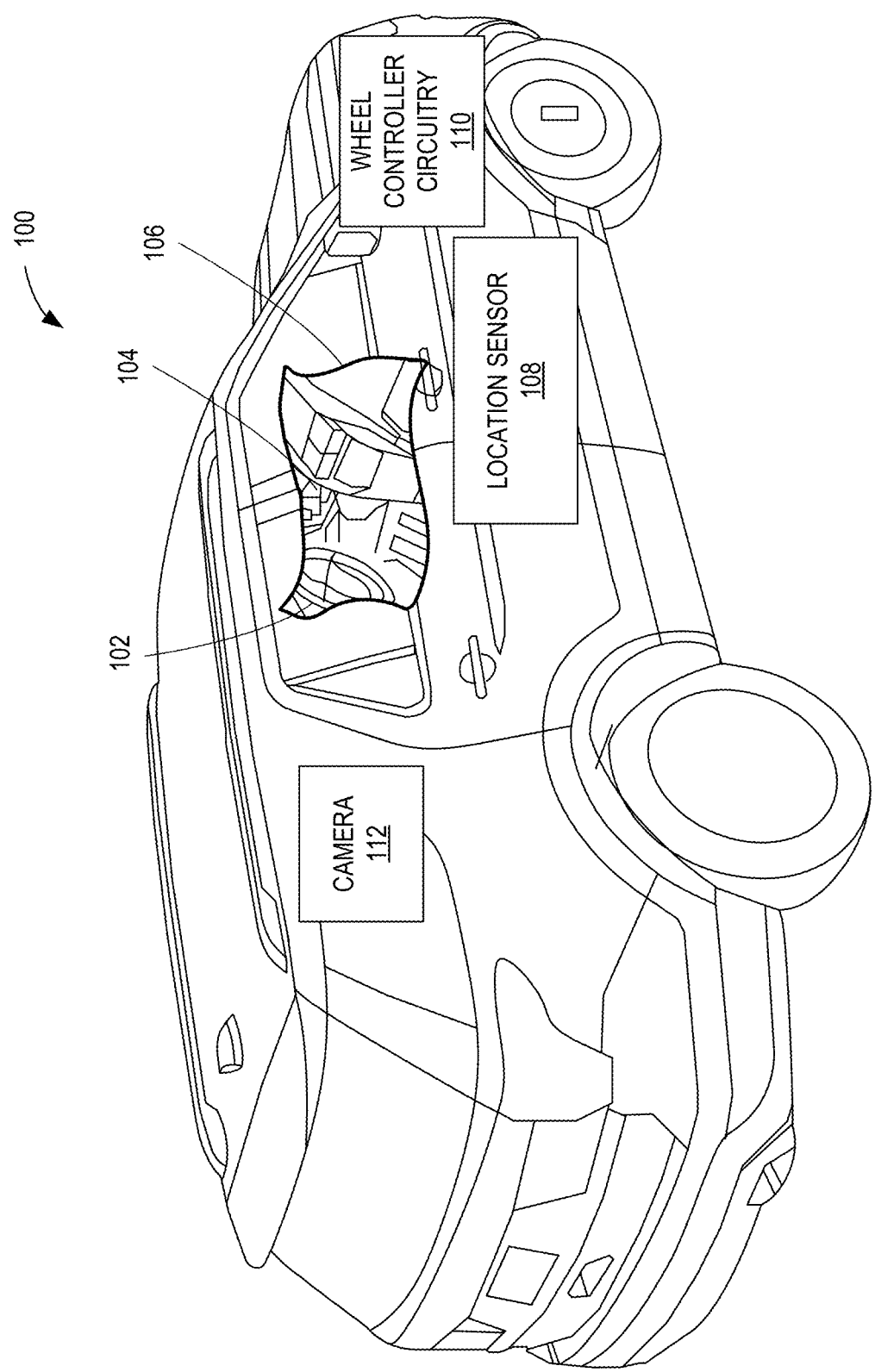
FIG. 1 depicts a vehicle in which examples disclosed herein can be implemented.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

DETAILED DESCRIPTION

Many vehicles used in automobile racing include removable steering wheels, which enable the steering wheel to be removed from the vehicle when not in use. Such removable steering wheels are typically released from the vehicle by actuating a mechanical lock using a lever, a pin, or a button. To remove the steering wheel from the steering system of a vehicle, a user must manually operate the lever, pin, or button, and physically remove the steering wheel from the steering column hub. Further, when placing the steering wheel on the steering column hub, the user must determine that the steering wheel is fully seated and secured on the steering shaft. Additionally, many prior removable steering wheels are retained via a mechanical lock. As such, prior removable steering wheels can be removed by users with physical access to the steering wheel.

Methods and apparatus disclosed herein improve on the prior art and include removable steering wheels with electrically controlled locking mechanisms. Examples disclosed herein further include removable steering wheel systems that enable the remote control of the vehicle via the removable steering wheel.

In examples disclosed herein the removable steering wheel system monitors the position of the steering wheel relative to the steering column hub using a plurality of position sensors. In some examples disclosed herein, the removable steering wheel system controls removal based on the satisfaction of one or more disengagement criteria. In some such examples disclosed herein, disengagement criteria include (1) the vehicle is in park (e.g., the vehicle is not in motion, traveling at 0 mph, stationary), (2) a charge of a battery of the removable steering wheel, and/or (3) the user is authorized to remove the steering wheel. In some such examples disclosed herein, an authorized user is a user who the removable steering wheel system has previously identified as an approved user to remove the steering wheel. In some such examples disclosed herein, the removable steering wheel system identifies the user via facial, aural (e.g., speech), bioinformatic (e.g., facial image, fingerprint, eye image, heartbeat), and/or password recognition through the infotainment center of the vehicle. In some such examples disclosed herein, after the removable steering wheel system identifies the user as an authorized user, the identification is stored in memory. Then, after the user subsequently attempts to remove the steering wheel, the removable steering wheel system can quickly verify the user to allow removal of the steering wheel. In some examples disclosed herein, after determining that one or more disengagement criteria have been satisfied, the removable steering wheel system moves an electronic lock from a closed position to an open position, which enables the removal of the steering wheel.

In some examples disclosed herein, removable steering wheels include sensors that track the location of the steering wheel in relation to the vehicle after the steering wheel is removed. In some such examples disclosed herein, after detection of a steering wheel engagement event by the sensors, the removable steering wheel system monitors the position of the steering wheel shaft within the steering column hub and engages the electronic lock when the steering wheel shaft is fully seated within the steering column hub. As used herein, the phrase "steering wheel engagement event" refers to a user action that indicates the user intends to couple a removed steering wheel to the steering column hub. Further, as used herein, the steering wheel shaft (e.g., the steering wheel, etc.) is "fully seated" in the steering column hub after the steering wheel shaft reaches the position where the steering wheel is used to operate the vehicle. Steering wheel engagement events include (1) physically placing the steering wheel shaft into the steering column hub, (2) bringing the steering wheel into threshold proximity of the vehicle, (3) inputting via the user interface to begin steering wheel engagement, etc.

In some examples disclosed herein, the steering wheel shaft and the steering column hub include complimentary grooves (e.g., splines, etc.) that enable a user to rotationally align the steering wheel shaft relative to the steering column hub (e.g., in a centered position, etc.). In some such examples disclosed herein, the removable steering wheel system uses at least one sensor to monitor the translational position of the steering wheel shaft relative to the steering column hub to determine that the steering wheel is fully seated in the steering column hub. In some such examples disclosed herein, after the steering wheel is fully seated in the steering column hub, the removable steering wheel system actuates an electronic lock from the open position to the closed position, which couples the steering wheel to the steering column hub. In some such examples disclosed herein, the removable steering wheel system actuates the electronic lock after receipt of output from the sensors that the steering wheel shaft is fully seated in the steering column hub.

FIG. 1 is a perspective view of an example vehicle 100 implemented in accordance with teachings of this disclosure. In the illustrated example of FIG. 1, the example vehicle 100 includes an example steering wheel 102, an example instrument panel 104 (e.g., the dashboard, the dash, etc.), an example passenger cabin 106, an example location sensor 108, example wheel controller circuitry 110, and an example camera 112. In the illustrated example of FIG. 1, the example vehicle 100 is a sport utility vehicle (SUV). In other examples, the vehicle 100 can be any type of vehicle (e.g., a van, a coup, a sedan, a pick-up truck, a semi-trailer truck, a minivan, a railed vehicle, an all-terrain vehicle (ATV), a watercraft, construction equipment, farming equipment, etc.). In the illustrated example of FIG. 1, the vehicle 100 is a two-axle vehicle. In other examples, the vehicle 100 can have additional axles and/or additional wheels.

The steering wheel 102 is removable from a coupled position (e.g., a connected position in the vehicle 100, etc.). After removal, the steering wheel 102 is a portable device, which can be used in the passenger cabin 106 inside of the vehicle 100 and/or exterior to the vehicle 100. When the steering wheel 102 is in the coupled position, an operator of the vehicle 100 can drive the vehicle 100 using the steering wheel 102 connected into the steering column hub of the vehicle 100. In some examples, after the steering wheel 102 is removed from the coupled position, an operator of the vehicle 100 (e.g., a person in the passenger cabin 106 inside the vehicle 100, a person outside the vehicle 100, etc.) can control the vehicle 100 via the steering wheel 102 (e.g., remotely drive the vehicle 100, operate one or more subsystems of the vehicle 100, etc.).

The location sensor 108 monitors the location of the steering wheel 102 inside and outside the vehicle 100. For example, the location sensor 108 monitors the location of the steering wheel 102 while the steering wheel 102 is removed from the coupled position. In some such examples, the wheel controller circuitry 110 can determine the location of the steering wheel 102 relative to the vehicle 100 via signal triangulation based on an output of the location sensor 108. In some such examples, an output of the location sensor 108 can be used by the wheel controller circuitry 110 to determine if the steering wheel 102 is in the interior or the exterior of the vehicle 100.

In some examples, the wheel controller circuitry 110 utilizes the camera 112 to locate the steering wheel 102 when the steering wheel 102 is removed from the steering column hub of the vehicle 100. In some examples, the camera 112 is instantiated by at least one interior camera and/or at least one exterior camera. While in the illustrated example of FIG. 1 one camera 112 is depicted, in other examples there may be more than one camera 112 to instantiate the functionality associated with the camera 112.

Figure 2:
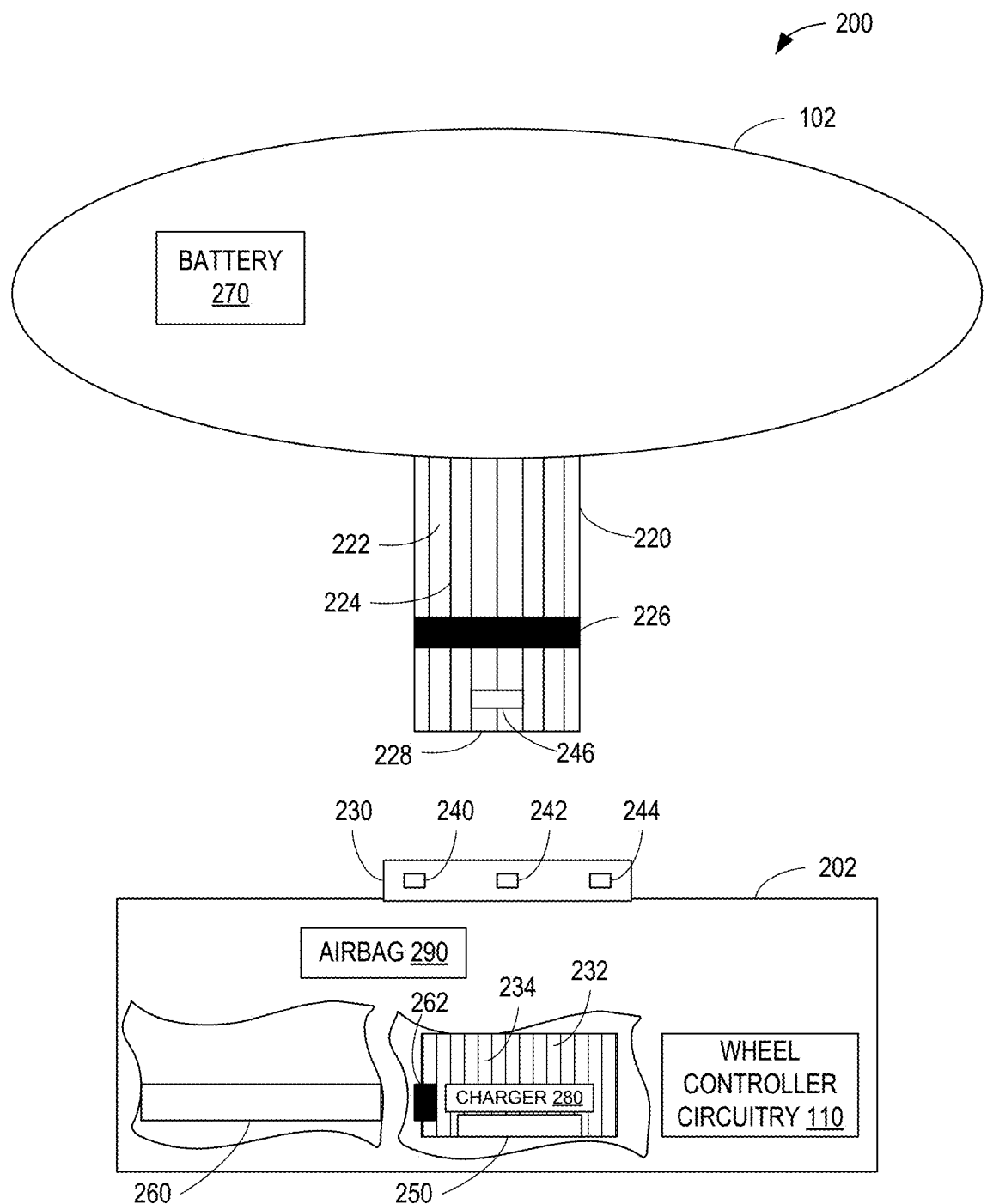
FIG. 2 is a schematic diagram of a steering system including the steering wheel of FIG. 1.

FIG. 2 is a schematic diagram of an example removable steering wheel assembly 200 including the steering wheel 102 of FIG. 1. In the illustrated example of FIG. 2, the position of the steering wheel 102 in relation to the steering column hub housing 202 is monitored by the wheel controller circuitry 110. An example implementation of the wheel controller circuitry 110 is further described in conjunction with FIG. 3. As disclosed herein, the wheel controller circuitry 110 can be implemented via at least one of programmable circuitry associated with the vehicle (e.g., an electronic control unit (ECU) of the vehicle, etc.), via programmable circuitry associated with the steering wheel (e.g., an ECU of the steering wheel, etc.), and/or a combination thereof.

In the illustrated example of FIG. 2, the example removable steering wheel assembly 200 includes an example steering wheel shaft 220 connected to the steering wheel 102, an example steering column hub 230, example position sensors 240, 242, 244, 246, an example electronic lock 250, and an example locking pin 260. In the illustrated example of FIG. 2, an outer surface 222 of the steering wheel shaft 220 includes example first grooves 224 and an inner surface 232 of the steering column hub 230 includes example second grooves 234. In the illustrated example of FIG. 2, the steering wheel shaft 220 has a first opening 226 that receives the locking pin 260 in the steering column hub 230 when the steering wheel 102 is coupled to the steering wheel shaft 220 and the electronic lock 250 is engaged. In the illustrated example of FIG. 2, the first opening 226 is oriented latitudinally. In other examples, the first opening 226 can be oriented longitudinally or in any other orientation.

The steering wheel shaft 220 is connected to and extends from the steering wheel 102. The steering wheel shaft 220 can be inserted into the steering column hub 230. In some examples, the steering wheel shaft 220 may remain in the steering column hub 230 upon removal of the steering wheel 102. In some such examples, the steering wheel shaft 220 includes an opening to receive the steering wheel 102 upon engagement of the steering wheel 102 with the steering wheel shaft 220.

In the illustrated example of FIG. 2, the steering column hub 230 includes first position sensors 240, 242, 244, which the wheel controller circuitry 110 uses to monitor the position of the steering wheel shaft 220 relative to the steering column hub 230. In the illustrated example of FIG. 2, the steering wheel shaft 220 includes a second position sensor 246 that the wheel controller circuitry 110 uses to monitor the position of the steering wheel shaft 220 in the steering column hub 230. While in the illustrated example of FIG. 2, the removable steering wheel assembly 200 includes four position sensors (e.g., the position sensors 240, 242, 244, 246, etc.), in other examples, the removable steering wheel assembly 200 can include any suitable number of position sensor(s) (e.g., one sensor, two sensors, three sensors, or more than four sensors, etc.). Additionally or alternatively, some or all of the position sensors 240, 242, 244, 246 may be located on the steering wheel shaft 220, the steering column hub 230, and/or other locations in the removable steering wheel assembly 200.

In the illustrated example of FIG. 2, the first grooves 224 (e.g., splines, etc.) of the steering wheel shaft 220 are complimentary with the second grooves 234 (e.g., splines, etc.) of the steering column hub 230. That is, the first grooves 224 can be aligned with or mate with the second grooves 234 to enable the deposition of the steering wheel shaft 220 within the steering column hub 230. In some examples, the pattern of the first grooves 224 and the second grooves 234 are specific to the vehicle 100 (e.g., in some vehicles the grooves are wider, narrower, at different positions, differing shapes, etc.). In such examples, the grooves 224, 234 are specific to the vehicle 100 to ensure that another removable steering wheel similar to the removable steering wheel 102 (e.g., a removable steering wheel 102 from the same make and model as the vehicle 100, etc.) is not coupled to the steering column hub 230 and used in the vehicle 100. For example, a particular make and model of a vehicle can include many different combinations of complimentary groove patterns (e.g., 10, 50, 100, etc.) for the grooves 224, 234 to reduce the likelihood of an unintended compatibility between another removable steering wheel and the steering column hub 230. Further, in other examples, the grooves 224, 234 are absent (e.g., the shaft 220 and the inner surface 232 of steering column hub 230 are smooth, etc.).

The wheel controller circuitry 110 uses the position sensors 240, 242, 244, 246 to monitor the position of the steering wheel shaft 220 in the steering column hub 230. In some examples, the wheel controller circuitry 110 does not use the position sensors 240, 242, 244, 246 to monitor the position of the steering wheel shaft 220 in the steering column hub 230 until the steering wheel shaft 220 has traversed a threshold distance (e.g., 75% of the length of the steering column hub, etc.) into the steering column hub 230. In other examples, the wheel controller circuitry 110 monitors the position of the steering wheel shaft 220 via the position sensors 240, 242, 244, 246 before contact with the steering column hub 230.

After the wheel controller circuitry 110, through the use of the position sensors 240, 242, 244, 246, determines that the steering wheel 102 is fully seated in the steering column hub 230, the wheel controller circuitry 110 activates the electronic lock 250 to couple the steering wheel 102 to the steering column hub 230. In some examples, the wheel controller circuitry 110, through the position sensors 240, 242, 244, 246, detects that the first opening 226 is aligned with a second opening 262 based on a first output from a first sensor (e.g., at least one of the position sensors 240, 242, 244, 246) and a second output from a second sensor (e.g., at least one of the position sensors 240, 242, 244, 246). In this example, the first output and the second output are indicative of a relative position of the steering wheel shaft 220 and the steering column hub 230.

In the illustrated example of FIG. 2, activation of the electronic lock 250, by the wheel controller circuitry 110, moves the locking pin 260 from a first position (e.g., a disengaged position outside of the steering column hub 230, an open position, an unlocked position, etc.) to a second position (e.g., an engaged position inside the steering column hub 230, a closed position, a locked position, etc.). When the locking pin 260 is in the second position, the steering wheel shaft 220 is fixedly coupled to the steering column hub 230 via the interface between the locking pin 260 and the second opening 262. In some examples, the wheel controller circuitry 110 activates the electronic lock 250 to move the locking pin 260 to the closed position after a determination by the wheel controller circuitry 110 that the first opening 226 is aligned with the second opening 262. In some examples, to prevent unintended removal of the steering wheel 102 from the steering column hub 230, the electronic lock 250 can default the locking pin to the second position when the electronic lock 250 is unpowered (e.g., a power reserve of the vehicle 100 is depleted, etc.).

In some examples, the electronic lock 250 is a solenoid, an electromagnetic sensor, a capacitive sensor, etc. In some examples, the locking pin 260 is multiple pins or pushrods, a swing arm, a deployable tab, or other interference object to securely attach the steering wheel 102 to the steering column hub 230 so that the steering wheel shaft 220 cannot move translationally in the steering column hub 230. Further, in some examples, the wheel controller circuitry 110 can actuate the electronic lock 250 from the first position (e.g., the open position) to the second position (e.g., the closed position) based on feedback from the position sensors 240, 242, 244, 246 that the steering wheel shaft 220 has traversed a specified distance in the steering column hub 230. In some examples, the electronic lock 250 engages the locking pin 260 after an end 228 of the steering wheel shaft 220 user interfaces with the solenoid of the electronic lock 250.

In some examples, after the wheel controller circuitry 110 determines that the steering wheel 102 is fully seated and activates the electronic lock 250, the wheel controller circuitry 110 generates an indication that the installation of the steering wheel 102 is complete. For example, the wheel controller circuitry 110 can cause the steering wheel 102 to provide haptic feedback to the user through the steering wheel 102 or a seat in the vehicle 100 to indicate that installation of the steering wheel 102 is complete. Additionally or alternatively, the wheel controller circuitry 110 can provide a visual indication (e.g., via a light-emitting diode (LED) light, via a user interface of the steering wheel 102, etc.) and/or an audio indication (e.g., via a speaker of the vehicle 100, via a speaker of the steering wheel 102, etc.) after the steering wheel 102 is fully seated and locked via the electronic lock 250 in the steering column hub 230. In some examples, a user interface is attached to the steering wheel 102 and the wheel controller circuitry 110 generates a notification to the user via the user interface indicating that installation of the steering wheel 102 is complete.

To remove the steering wheel 102 from the steering column hub 230, the user inputs a request to remove the steering wheel 102 via a user interface of the vehicle 100 and/or the steering wheel 102. Then, the wheel controller circuitry 110 determines whether the steering wheel 102 can be removed based on the satisfaction of at least one disengagement criterion. In other examples, the user is required to fulfill multiple disengagement criteria before removal of the steering wheel. In some examples, the disengagement criterion may be that the vehicle 100 is in park (e.g., the vehicle 100 is not in motion, traveling at 0 mph, stationary, etc.), the wheel controller circuitry 110 verifies the user as an authorized user, and/or the wheel controller circuitry 110 determines that a battery 270 of the steering wheel 102 is above a predetermined threshold. In some examples, the wheel controller circuitry 110 verifies the user as an authorized user of the steering wheel 102 through user input (e.g., via facial recognition, aural (e.g., speech) recognition, bioinformatic recognition (e.g., facial image, fingerprint, eye image, heartbeat), and/or password recognition, etc.). Further, in some examples, the wheel controller circuitry 110, after fulfillment of a disengagement criterion, disengages the electronic lock 250. For example, the wheel controller circuitry 110 activates a field-effect transistor (FET) that powers the electronic lock 250 (e.g., solenoid) to disengage the locking pin 260 (e.g., move the locking pin 260 to the open position, etc.). After the wheel controller circuitry 110 has disengaged the electronic lock 250, a user can physically remove the steering wheel 102 from the steering column hub 230.

After the steering wheel 102 is removed from the vehicle, the user can use the steering wheel 102 to remotely operate the vehicle 100. To use the steering wheel 102 after removal from the vehicle 100, the user can input a request, via the infotainment center (e.g., the instrument panel 104 of the vehicle 100, etc.) or an user interface on the steering wheel 102, a request to initiate the use of the steering wheel 102, and perform facial, aural (e.g., speech), bioinformatic (e.g., facial image, fingerprint, eye image), and/or password recognition to verify the identity of the user prior to operation of the vehicle 100.

In the illustrated example of FIG. 2, the steering wheel 102 includes the battery 270. In some examples, the battery 270 is a rechargeable battery. In some such examples, the battery 270 charges while the steering wheel 102 is connected to the vehicle 100 (e.g., in the first position and/or the coupled position, etc.) via an example charger 280. In some examples, the charger 280 is an inductive charger in the steering wheel shaft 220 and the steering column hub 230. In other examples, the charger 280 can charge the battery 270 via a wired connection formed when the steering wheel 102 is coupled to the steering column hub 230. The charger 280 can charge the battery 270 via the power of a power reservoir of the vehicle 100.

In the illustrated example of FIG. 2, the steering column hub housing 202 includes an example airbag 290. In the illustrated example of FIG. 2, the airbag 290 remains coupled to the steering column hub housing 202 after the steering wheel 102 is removed. In other examples, the airbag 290 is incorporated into the steering wheel 102 and/or is absent from the steering wheel 102.

Figure 3:
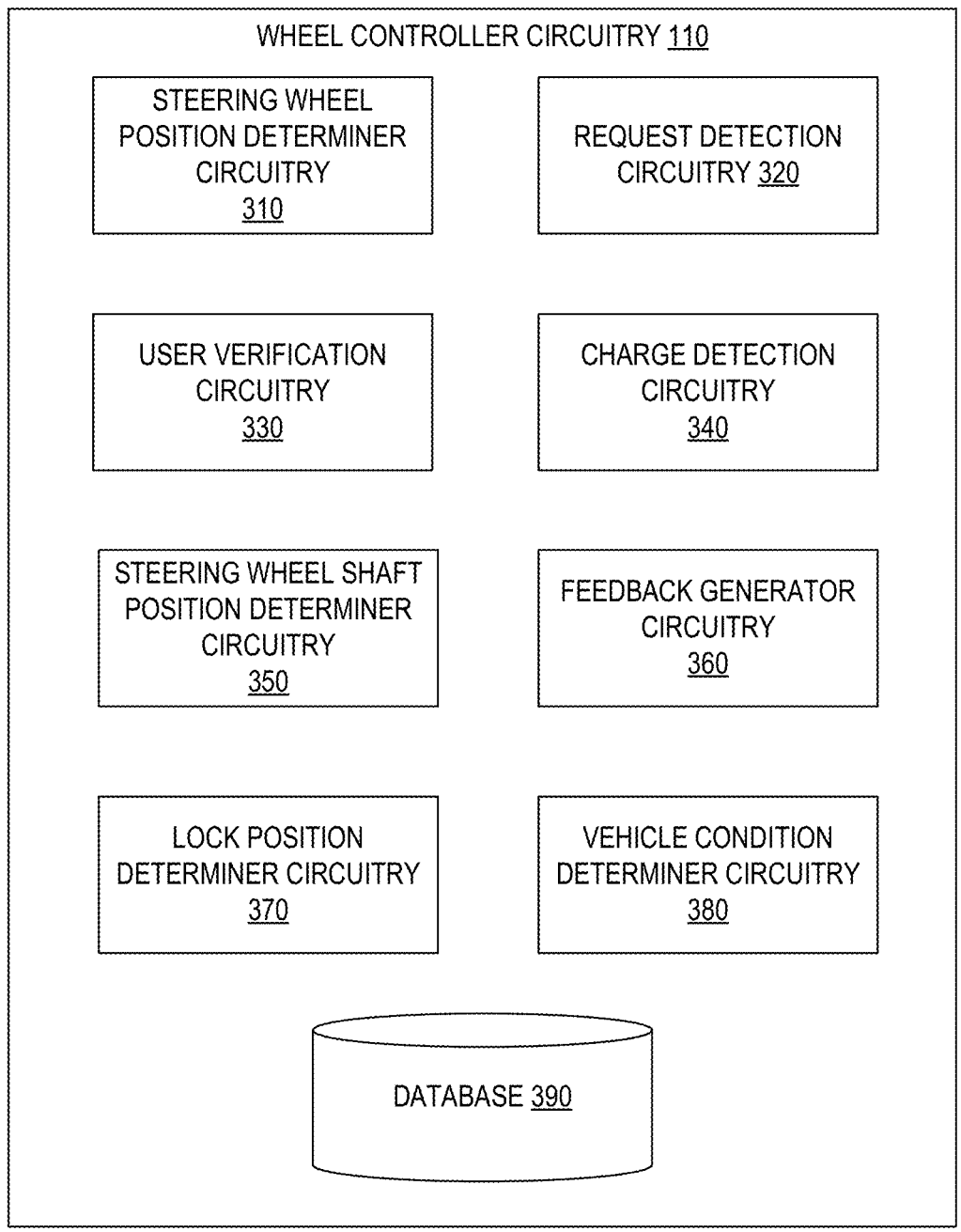
FIG. 3 is a block diagram of an example implementation of the wheel controller circuitry of FIG. 1.

FIG. 3 is a block diagram of an example implementation of the wheel controller circuitry 110 of FIG. 2 to monitor the removal of the steering wheel 102. In the illustrated example of FIG. 3, the wheel controller circuitry 110 includes example steering wheel position determiner circuitry 310, example request detection circuitry 320, example user verification circuitry 330, example charge detection circuitry 340, example steering wheel shaft position determiner circuitry 350, example feedback generator circuitry 360, example lock position determiner circuitry 370, example vehicle condition determiner circuitry 380, and an example database 390. The wheel controller circuitry 110 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the wheel controller circuitry 110 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The steering wheel position determiner circuitry 310 determines the position of the steering wheel 102. For example, the steering wheel position determiner circuitry 310 determines whether the steering wheel 102 is located inside or outside of the passenger cabin 106 and/or is coupled to the steering column hub 230. The steering wheel position determiner circuitry 310 can wirelessly interface with one or more position sensors of the steering wheel 102 (e.g., the position sensors 240, 242, 244, 246, a first sensor, a second sensor, etc.) and/or the vehicle 100 (e.g., the location sensor 108 of FIG. 1, a third sensor, etc.). Further, in some examples, the steering wheel position determiner circuitry 310 may use interior and exterior cameras to identify the location of the steering wheel 102. In some examples, the steering wheel position determiner circuitry 310 determines the position of the steering wheel 102 as within a threshold distance of the vehicle 100 to enable detection of a request to engage or disengage the steering wheel 102 by the request detection circuitry 320. In some examples, the steering wheel position determiner circuitry 310 is instantiated by programmable circuitry executing steering wheel position determination instructions and/or configured to perform operations such as those represented by the flowchart of FIG. 11 (block 1110).

In some examples, the wheel controller circuitry 110 includes means for determining the position of the steering wheel 102. For example, the means for determining may be implemented by steering wheel position determiner circuitry 310. In some examples, the steering wheel position determiner circuitry 310 may be instantiated by programmable circuitry such as the example programmable circuitry 1412 of FIG. 14. For instance, the steering wheel position determiner circuitry 310 may be instantiated by the example microprocessor executing machine executable instructions such as those implemented by at least block 1110 of FIG. 11. In some examples, the steering wheel position determiner circuitry 310 may be instantiated by hardware logic circuitry, which may be implemented by an ASIC, XPU, or the FPGA circuitry configured and/or structured to perform operations corresponding to the machine readable instructions. Additionally or alternatively, the steering wheel position determiner circuitry 310 may be instantiated by any other combination of hardware, software, and/or firmware. For example, the steering wheel position determiner circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The request detection circuitry 320 detects requests to disengage and/or engage the steering wheel 102. For example, the request detection circuitry 320 can detect a request to disengage and/or engage the steering wheel 102, which signals to the wheel controller circuitry 110 that the user wishes to attach or detach the steering wheel 102 to or from the vehicle 100, respectively. For example, the request detection circuitry 320 detects a request to engage the steering wheel 102 based on the proximity of the steering wheel 102 to the vehicle 100, a user placing the steering wheel 102 into the steering column hub 230, and/or a user submitting the request via a user interface (e.g., the user interface 700 of FIG. 7, etc.) of the steering wheel 102 and/or the vehicle 100 to engage the steering wheel 102. In some examples, the request detection circuitry 320 detects a request to disengage the steering wheel 102 based on a user submitting the request via the user interface (e.g., the user interface 700 of FIG. 7, etc.) to remove the steering wheel 102 from the steering column hub 230 of the vehicle 100, the user attempts to remove the steering wheel 102 from the steering column hub 230 of the vehicle 100, and/or the user begins to exit the vehicle 100. In some examples, the request detection circuitry 320 is instantiated by programmable circuitry executing request detection instructions and/or configured to perform operations such as those represented by the flowchart of FIG. 11 (blocks 1110 and 1140).

In some examples, the wheel controller circuitry 110 includes means for detecting a request to disengage and/or engage the steering wheel 102. For example, the means for detecting may be implemented by request detection circuitry 320. In some examples, the request detection circuitry 320 may be instantiated by programmable circuitry such as the example programmable circuitry 1412 of FIG. 14. For instance, the request detection circuitry 320 may be instantiated by the example microprocessor executing machine executable instructions such as those implemented by at least blocks 1110, 1140 of FIG. 11. In some examples, the request detection circuitry 320 may be instantiated by hardware logic circuitry, which may be implemented by an ASIC, XPU, or the FPGA circuitry configured and/or structured to perform operations corresponding to the machine readable instructions. Additionally or alternatively, the request detection circuitry 320 may be instantiated by any other combination of hardware, software, and/or firmware. For example, the request detection circuitry 320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The user verification circuitry 330 verifies the identity of a user of the vehicle 100. In some examples, the user verification circuitry 330 determines, via user input, a "user authentication mode." As used herein, a "user authentication mode" determines how the user is verified by the wheel controller circuitry 210 to enable disengagement of the steering wheel 102. In some such examples, the user authentication mode can be selected via the user interface. In some such examples, the user authentication mode verifies the user through facial, aural (e.g., speech), bioinformatic (e.g., facial image, fingerprint, eye image, heartbeat), and/or password recognition via the user interface. Further, in some examples, after the steering wheel 102 is removed from the vehicle 100, the user verification circuitry 330 verifies a user via the user interface (e.g., the user interface 700 from FIG. 7, etc.) on the steering wheel 102 to enable the user to operate the steering wheel 102 and/or the vehicle 100 using the steering wheel 102. To unlock the user interface on the steering wheel 102, the user verification circuitry 330 may prompt the user to perform facial, aural (e.g., speech), bioinformatic (e.g., facial image, fingerprint, eye image, heartbeat), and/or password recognition. Based on the user input (e.g., password, facial image, speech, etc.), the user verification circuitry 330 compares the user input to a user profile stored in the database 390 of the vehicle 100 to determine whether the user input corresponds to the user profile in the database 390. If the user input corresponds to the user profile, the user verification circuitry 330 outputs a successful verification notification to the wheel controller circuitry 110. If the user input does not correspond to the user profile, the user verification circuitry 330 causes the user interface to display a notification that the disengagement criterion is not satisfied. In some examples, the user verification circuitry 330 is instantiated by programmable circuitry executing user verification instructions and/or configured to perform operations such as those represented by the flowchart of FIG. 13 (blocks 1330, 1350, and 1370).

In some examples, the wheel controller circuitry 110 includes means for verifying the identity of a user of the vehicle 100. For example, the means for verifying may be implemented by the user verification circuitry 330. In some examples, the user verification circuitry 330 may be instantiated by programmable circuitry such as the example programmable circuitry 1412 of FIG. 14. For instance, the user verification circuitry 330 may be instantiated by the example microprocessor executing machine executable instructions such as those implemented by at least blocks 1330, 1350, 1370 of FIG. 13. In some examples, the user verification circuitry 330 may be instantiated by hardware logic circuitry, which may be implemented by an ASIC, XPU, or the FPGA circuitry configured and/or structured to perform operations corresponding to the machine readable instructions. Additionally or alternatively, the user verification circuitry 330 may be instantiated by any other combination of hardware, software, and/or firmware. For example, the user verification circuitry 330 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The charge detection circuitry 340 determines the charge of the battery 270 of the steering wheel 102. In some examples, the charge detection circuitry 340 determines whether the charge of the battery 270 is above a threshold. If the charge of the battery 270 is above the threshold, the charge detection circuitry 340 allows the steering wheel 102 to be removed from the vehicle 100. Further, if the charge of the battery 270 is not above the threshold, the charge detection circuitry 340 does not allow the steering wheel to be removed from the vehicle 100. In some examples, the charge detection circuitry 340 is instantiated by programmable circuitry executing charge detection instructions and/or configured to perform operations such as those represented by the flowchart of FIG. 13 (block 1360).

In some examples, the wheel controller circuitry 110 includes means for determining the charge of the battery 270 of the steering wheel 102. For example, the means for determining may be implemented by the charge detection circuitry 340. In some examples, the charge detection circuitry 340 may be instantiated by programmable circuitry such as the example programmable circuitry 1412 of FIG. 14. For instance, the charge detection circuitry 340 may be instantiated by the example microprocessor executing machine executable instructions such as those implemented by at least block 1360 of FIG. 13. In some examples, the charge detection circuitry 340 may be instantiated by hardware logic circuitry, which may be implemented by an ASIC, XPU, or the FPGA circuitry configured and/or structured to perform operations corresponding to the machine readable instructions. Additionally or alternatively, the charge detection circuitry 340 may be instantiated by any other combination of hardware, software, and/or firmware. For example, the charge detection circuitry 340 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The steering wheel shaft position determiner circuitry 350 determines the position of the steering wheel shaft 220 relative to the steering column hub 230 of the vehicle 100. In some examples, the steering wheel shaft position determiner circuitry 350 determines whether the steering wheel 102 is in position (e.g., the steering wheel shaft 220 is a threshold distance into the steering column hub 230, etc.) relative to the steering column hub 230 to enable the position sensors (e.g., the position sensors 240, 242, 244, 246, etc.). After the steering wheel shaft position determiner circuitry 350 determines that the steering wheel 102 is in position relative to the steering column hub 230, the steering wheel shaft position determiner circuitry 350 enables the position sensors (e.g., the position sensors 240, 242, 244, 246, etc.) to monitor the relative position of the steering wheel 102 (e.g., the steering wheel shaft 220) in the steering column hub 230. After the steering wheel shaft position determiner circuitry 350 determines that the steering wheel 102 is fully seated in the steering column hub 230, the locking pin 260 can actuate. If the steering wheel shaft position determiner circuitry 350 determines that the steering wheel 102 is not fully seated in the steering column hub 230, the steering wheel shaft position determiner circuitry 350 instructs the user to reseat the steering wheel 102. Further, in some examples, multiple position sensors may be implemented to redundantly monitor the relative position of the steering wheel shaft 220 in the steering column hub 230. In some examples, the steering wheel shaft position determiner circuitry 350 is instantiated by programmable circuitry executing steering wheel shaft position determination instructions and/or configured to perform operations such as those represented by the flowchart of FIGS. 11 (blocks 1120 and 1130) and 12 (blocks 1210, 1220, 1230, and 1240).

In some examples, the wheel controller circuitry 110 includes means for determining the position of the steering wheel shaft 220 relative to the steering column hub 230 of the vehicle 100. For example, the means for determining may be implemented by the steering wheel shaft position determiner circuitry 350. In some examples, the steering wheel shaft position determiner circuitry 350 may be instantiated by programmable circuitry such as the example programmable circuitry 1412 of FIG. 14. For instance, the steering wheel shaft position determiner circuitry 350 may be instantiated by the example microprocessor executing machine executable instructions such as those implemented by at least blocks 1120, 1130 of FIG. 11 and blocks 1210, 1220, 1230, 1240 of FIG. 12. In some examples, the steering wheel shaft position determiner circuitry 350 may be instantiated by hardware logic circuitry, which may be implemented by an ASIC, XPU, or the FPGA circuitry configured and/or structured to perform operations corresponding to the machine readable instructions. Additionally or alternatively, the steering wheel shaft position determiner circuitry 350 may be instantiated by any other combination of hardware, software, and/or firmware. For example, the steering wheel shaft position determiner circuitry 350 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The feedback generator circuitry 360 provides one or more indication(s) to the user that the steering wheel 102 is fully seated into the vehicle 100 (e.g., the steering column hub 230, etc.) and/or whether a disengagement criterion is satisfied. The feedback generator circuitry 360 provides feedback to the user after the steering wheel 102 is fully seated and latched into the steering column hub. Further, in some examples, the feedback generator circuitry 360 provides haptic feedback to the driver through the steering wheel 102 and/or the seat of the vehicle 100. In some examples, the feedback generator circuitry 360 displays a notification via the user interface (e.g., the user interface 510 of FIG. 5A, etc.) after a determination that a disengagement criterion is not satisfied. In some examples, the feedback generator circuitry 360 displays a notification via the user interface after a determination that the vehicle 100 is not in park, the user authentication mode is not selected, the user is not verified, and/or the charge of the battery 270 of the steering wheel 102 is not above a threshold. In some examples, the feedback generator circuitry 360 is instantiated by programmable circuitry executing feedback generation instructions and/or configured to perform operations such as those represented by the flowchart of FIGS. 12 (block 1280) and 13 (blocks 1320, 1340, and 1370).

In some examples, the wheel controller circuitry 110 includes means for providing one or more indication(s) to the user that the steering wheel is fully seated into the vehicle and/or whether a disengagement criterion is satisfied. For example, the means for providing may be implemented by feedback generator circuitry 360. In some examples, the feedback generator circuitry 360 may be instantiated by programmable circuitry such as the example programmable circuitry 1412 of FIG. 14. For instance, the feedback generator circuitry 360 may be instantiated by the example microprocessor executing machine executable instructions such as those implemented by at least block 1280 of FIG. 12 and blocks 1320, 1340, 1370 of FIG. 13. In some examples, the feedback generator circuitry 360 may be instantiated by hardware logic circuitry, which may be implemented by an ASIC, XPU, or the FPGA circuitry configured and/or structured to perform operations corresponding to the machine readable instructions. Additionally or alternatively, the feedback generator circuitry 360 may be instantiated by any other combination of hardware, software, and/or firmware. For example, the feedback generator circuitry 360 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The lock position determiner circuitry 370 determines whether to increase or decrease power to the electronic lock 250. In some examples, the lock position determiner circuitry 370 decreases power to the electronic lock 250 to cause the electronic lock 250 to engage the locking pin 260. In some examples, the lock position determiner circuitry 370 determines whether to increase or decrease power to the electronic lock 250 based on the position of the steering wheel shaft 220 in the steering column hub 230. In some such examples, the lock position determiner circuitry 370 receives feedback from the steering wheel shaft position determiner circuitry 310 concerning the position of the steering wheel steering shaft 220 in the steering column hub 230. In some examples, the lock position determiner circuitry 370 increases power to the electronic lock 250 after a determination that at least one disengagement criterion is satisfied. In some such examples, after the lock position determiner circuitry 370 increases power to the electronic lock 250, the lock position determiner circuitry 370 disengages the locking pin 260 to allow removal of the steering wheel 102 from the steering column hub 230. In some examples, the lock position determiner circuitry 370 is instantiated by programmable circuitry executing lock position determination instructions and/or configured to perform operations such as those represented by the flowcharts of FIGS. 11 (block 1150), 12 (blocks 1250, 1260, and 1270), and 13 (blocks 1380 and 1390).

In some examples, the wheel controller circuitry 110 includes means for determining whether to increase or decrease power to the electronic lock. For example, the means for determining may be implemented by lock position determiner circuitry 370. In some examples, the lock position determiner circuitry 370 may be instantiated by programmable circuitry such as the example programmable circuitry 1412 of FIG. 14. For instance, the lock position determiner circuitry 370 may be instantiated by the example microprocessor executing machine executable instructions such as those implemented by at least block 1150 of FIG. 11; blocks 1250, 1260, and 1270 of FIG. 12; and blocks 1380 and 1390 of FIG. 13. In some examples, the lock position determiner circuitry 370 may be instantiated by hardware logic circuitry, which may be implemented by an ASIC, XPU, or the FPGA circuitry configured and/or structured to perform operations corresponding to the machine readable instructions. Additionally or alternatively, the lock position determiner circuitry 370 may be instantiated by any other combination of hardware, software, and/or firmware. For example, the lock position determiner circuitry 370 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The vehicle condition determiner circuitry 380 determines the condition of the vehicle 100. In some examples, the vehicle condition determiner circuitry 380 determines the condition of the vehicle 100 after a request to disengage and/or engage the steering wheel 102 with the vehicle 100. In some examples, after a request to disengage the steering wheel 102, the vehicle condition determiner circuitry 380 determines whether the vehicle 100 is in park (e.g., a parking gear is engaged, etc.) and/or in motion (e.g., traveling at a speed above 0 mph, etc.). In some examples, after a request to engage the steering wheel 102, the vehicle condition determiner circuitry 380 determines whether the steering wheel 102 is within a threshold proximity to the vehicle 100 (e.g., based on feedback from the steering wheel position determiner circuitry 310, etc.). In some examples, the vehicle condition determiner circuitry 380 is instantiated by programmable circuitry executing vehicle condition determination instructions and/or configured to perform operations such as those represented by the flowcharts of FIGS. 12 (block 1210) and 13 (block 1310).

In some examples, the wheel controller circuitry 110 includes means for determining the condition of the vehicle. For example, the means for determining may be implemented by vehicle condition determiner circuitry 380. In some examples, the vehicle condition determiner circuitry 380 may be instantiated by programmable circuitry such as the example programmable circuitry 1412 of FIG. 14. For instance, the vehicle condition determiner circuitry 380 may be instantiated by the example microprocessor executing machine executable instructions such as those implemented by at least block 1210 of FIG. 12 and block 1310 of FIG. 13. In some examples, the vehicle condition determiner circuitry 380 may be instantiated by hardware logic circuitry, which may be implemented by an ASIC, XPU, or the FPGA circuitry configured and/or structured to perform operations corresponding to the machine readable instructions. Additionally or alternatively, the vehicle condition determiner circuitry 380 may be instantiated by any other combination of hardware, software, and/or firmware. For example, the vehicle condition determiner circuitry 380 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The database 390 stores a user profile. The user profile can include information to identify a user such as the password chosen by the user, facial recognition data, aural (e.g., speech) recognition data, other bioinformatic (e.g., facial image, fingerprint, eye image, heartbeat) recognition information, and/or other data collected to identify the user after the user first interacts with the steering wheel 102. In some examples, there may be more than one database 390. Further, the database 390 may be implemented by the memories of the processor platform described in connection with FIG. 14. In some examples, the database 390 is instantiated by programmable circuitry executing storage instructions and/or configured to perform operations such as those represented by the flowchart of FIG. 13 (block 1350).

In some examples, the wheel controller circuitry 110 includes means for storing a user profile. For example, the means for storing may be implemented by the database 390. In some examples, the database 390 may be instantiated by programmable circuitry such as the example programmable circuitry 1412 of FIG. 14. For instance, the database 390 may be instantiated by the example microprocessor executing machine executable instructions such as those implemented by at least block 1350 of FIG. 13. In some examples, the database 390 may be instantiated by hardware logic circuitry, which may be implemented by an ASIC, XPU, or the FPGA circuitry configured and/or structured to perform operations corresponding to the machine readable instructions. Additionally or alternatively, the database 390 may be instantiated by any other combination of hardware, software, and/or firmware. For example, the database 390 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the wheel controller circuitry 110 of FIG. 1 is illustrated in FIG. 3, one or more of the elements, processes, and/or devices illustrated in FIG. 3 may be combined, divided, re-arranged, omitted, eliminated, and/or implemented in any other way. Further, the example steering wheel position determiner circuitry 310, the example request detection circuitry 320, the example user verification circuitry 330, the example charge detection circuitry 340, the example steering wheel shaft position determiner circuitry 350, the example feedback generator circuitry 360, the example lock position determiner circuitry 370, the example vehicle condition determiner circuitry 380, the example database 390, and/or, more generally, the example wheel controller circuitry 110 of FIG. 3, may be implemented by hardware alone or by hardware in combination with software and/or firmware. Thus, for example, any of the example steering wheel position determiner circuitry 310, the example request detection circuitry 320, the example user verification circuitry 330, the example charge detection circuitry 340, the example steering wheel shaft position determiner circuitry 350, the example feedback generator circuitry 360, the example lock position determiner circuitry 370, the example vehicle condition determiner circuitry 380, the example database 390, and/or, more generally, the example wheel controller circuitry 110 of FIG. 3, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example wheel controller circuitry 110 of FIG. 3 may include one or more elements, processes, and/or devices in addition to, or instead of, those illustrated in FIG. 3, and/or may include more than one of any or all of the illustrated elements, processes and devices.

Figure 4:
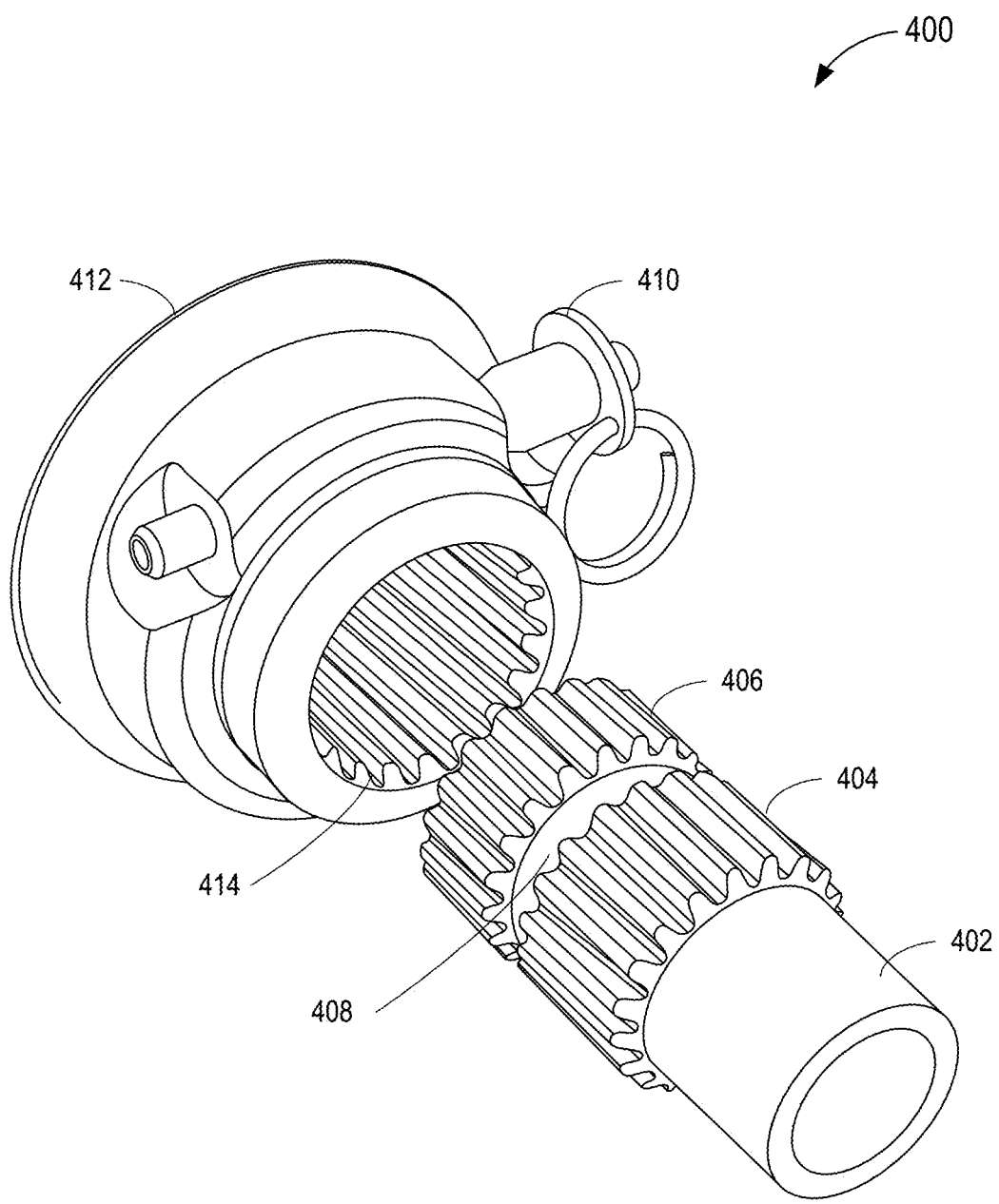
FIG. 4 is an example diagram of an example steering column hub, an example steering wheel shaft, and an example lock that may be implemented in the steering wheel of FIG. 1.

FIG. 4 shows an example diagram of an example assembly 400 including an example steering wheel shaft 402, an example steering column hub 412, and an example locking pin 410 that may be implemented in the steering wheel of FIG. 1. In this example, the steering wheel shaft 402 has grooves 404, 406 (e.g., splines, first grooves) which are longitudinal relative to the steering wheel shaft 402. However, in other examples, the grooves 404, 406 are oriented in the latitudinal direction or any other orientation. In the illustrated example of FIG. 4, the grooves 404, 406 are separated by an opening 408. In some examples, the opening 408 is oriented in the latitudinal direction relative to the steering wheel shaft 402. In other examples, the opening 408 can be a hole (e.g., a blind hole, a through hole, etc.) having any other orientation (e.g., vertically, laterally, etc.). In the illustrated example of FIG. 4, the opening 408 is positioned on the steering wheel shaft 402 such that a locking pin 410 secures the steering wheel shaft 402 after the steering wheel shaft 402 is inserted into the steering column hub 412.

The locking pin 410 secures the steering wheel shaft 402 in the steering column hub 412 to inhibit translational motion of the steering wheel shaft 402 in the steering column hub 412. While in the illustrated example of FIG. 4 the locking pin 410 is utilized to secure the steering wheel shaft 402, in other examples the locking pin 410 can include multiple pins, multiple pushrods, a swing arm, a deployable tab, or other interference object to securely attach the steering wheel 102 to the steering column hub 230 such that the steering wheel shaft 220 cannot move translationally in the steering column hub 230. In the illustrated example of FIG. 4, the steering column hub 412 is lined with grooves 414 (e.g., splines, second grooves) that correspond to the grooves 404, 406 of the steering wheel shaft 402 (e.g., are complimentary with the grooves 404, 406, etc.).

The grooves 414 correspond to the grooves 404, 406 such that a specific steering wheel shaft 402 can only be inserted into the steering column hub 412. In this example, the grooves 404, 406, 414 are shaped as straight lines. However, in other examples, the grooves 404, 406, 414 are patterned and/or otherwise shaped. Further, in the illustrated example of FIG. 4, the grooves 404, 406, 414 are raised from the surface of the steering wheel shaft 402 and the steering column hub 412. However, in other examples, the grooves 404, 406, 414 are indented into the surface of the steering wheel shaft 402 and/or the steering column hub 412. In this example, the locking pin 410 actuates after power is decreased to an electronic lock (e.g., the electronic lock 250 of FIG. 2, etc.). In some examples, power to the electronic lock (e.g., the electronic lock 250 of FIG. 2, etc.) is decreased after a determination by the wheel controller circuitry 110 that the steering wheel shaft 402 is fully seated in the steering column hub 412. In some such examples, the wheel controller circuitry 110 determines to activate the locking pin 410 after the locking pin 410 aligns with the opening 408. In some examples, the locking pin 410 manually or automatically actuates via the wheel controller circuitry 110 after the steering wheel shaft 402 is at a predetermined position relative to the steering column hub 412. In some examples, the wheel controller circuitry 110 actuates the locking pin 410 in response to the steering wheel shaft 402 being fully seated in the steering column hub 412.

Figure 5A:
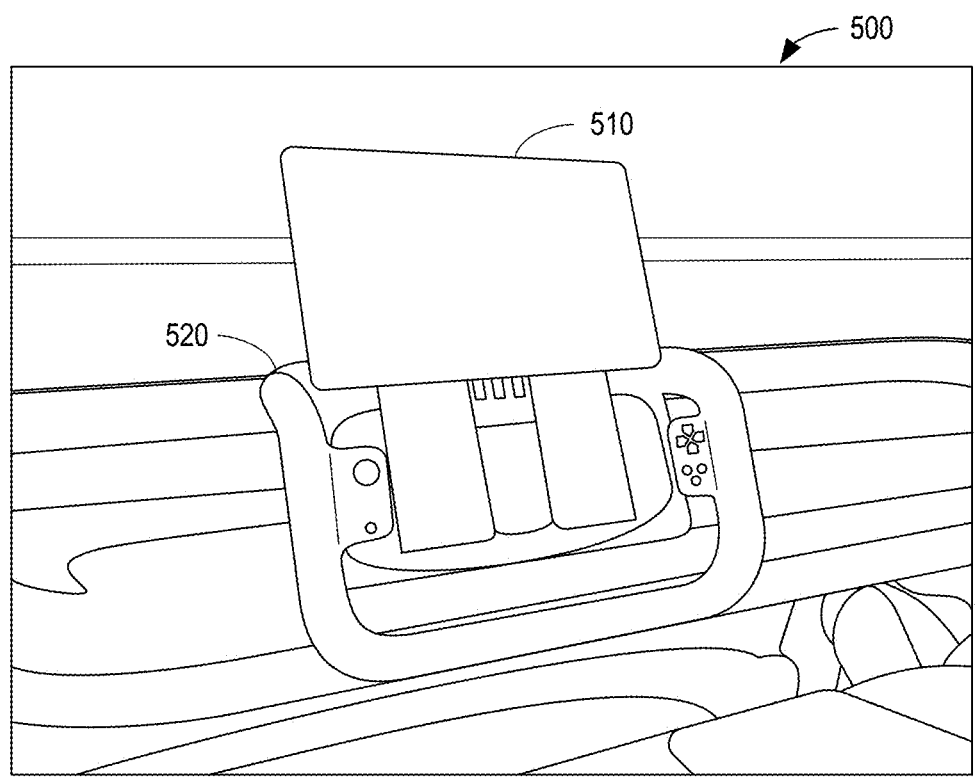
FIGS. 5A-5B are an example diagram of an example removable user interface that may be implemented with the steering wheel of FIG. 1.
Figure 5B:
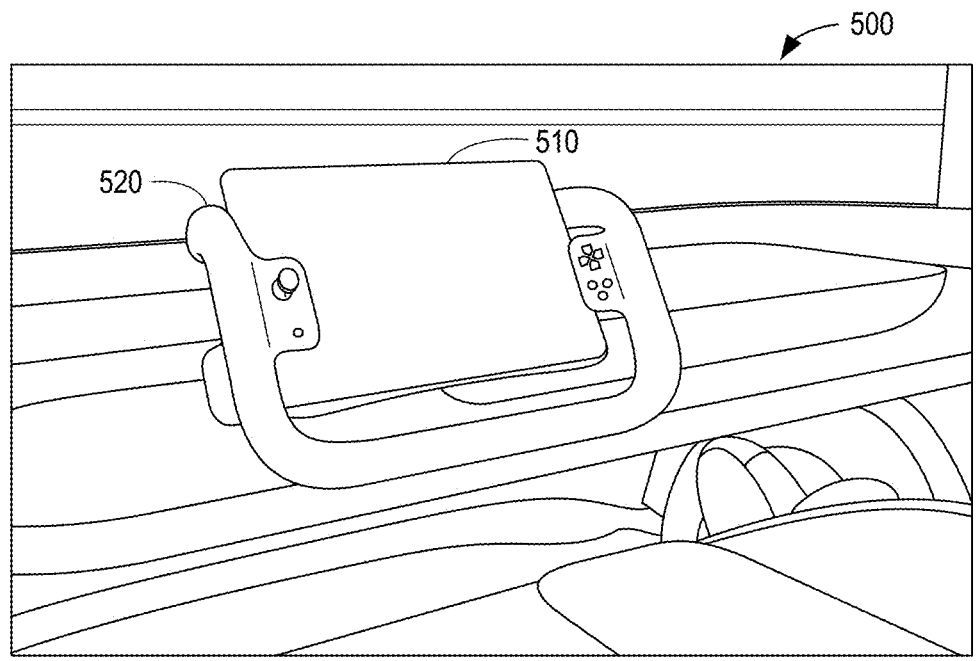

FIGS. 5A-5B depict an example environment 500 for operation of the removable steering wheel assembly 200. As shown in this example, an example user interface 510 is removable from an example steering wheel frame 520. In some examples, the user interface 510 is implemented by a tablet, an LED display, and/or any other suitable display device. In this example, the user interface 510 is removable from the steering wheel frame 520, and can be placed into another steering wheel frame for use outside of the vehicle. However, in other examples, the steering wheel frame 520 is removable, with the user interface 510, for use outside the vehicle.

Figure 6:
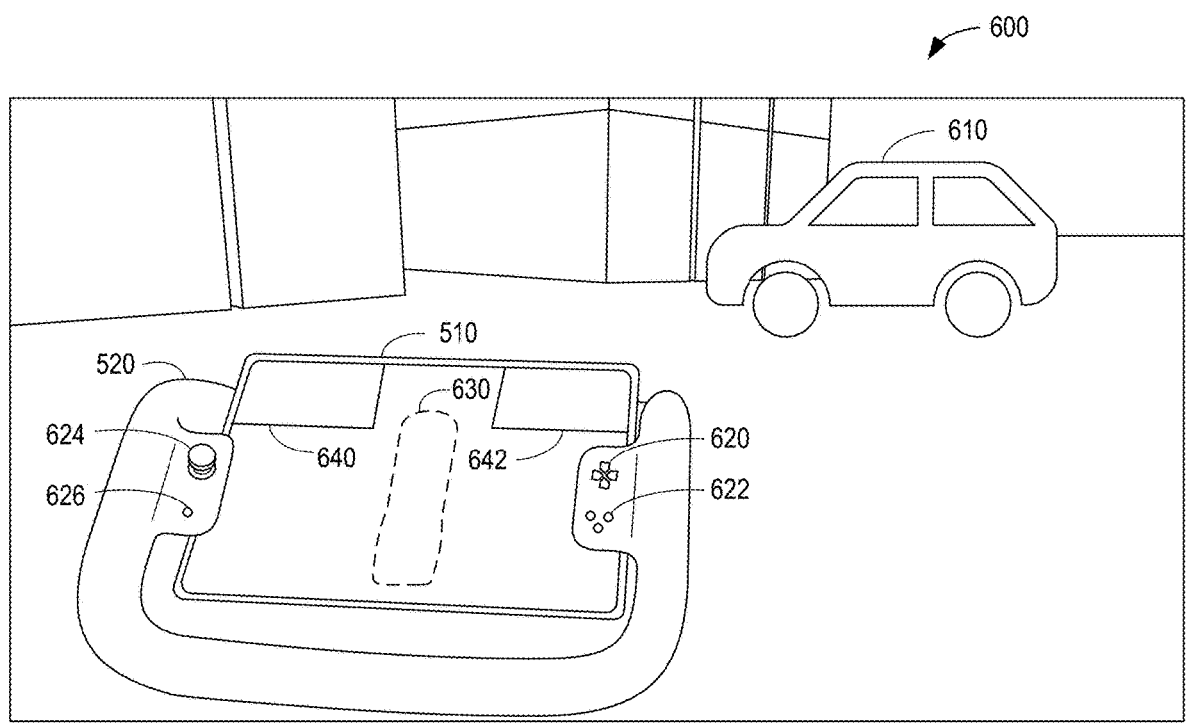
FIG. 6 is an example diagram of an example removable steering wheel and example user interface that may be implemented with the vehicle of FIG. 1.

FIG. 6 is an example environment 600 of the removable steering wheel assembly 200. In this example, the steering wheel frame 520, with the attached user interface 510, is outside of the vehicle 610 and is used to remotely operate the vehicle 610. In some examples, the steering wheel frame 520, with the attached user interface 510, can be used to drive the vehicle 610 by turning the steering wheel frame 520 to correspond to the desired direction of travel of the vehicle 610 and/or by utilizing the buttons 620, 622, 624, 626. Further, the user interface 510 shows a graphical top-down depiction 630 of the position of the vehicle 610 and the environment 640, 642 surrounding the vehicle 610. Additionally or alternatively, in other examples, the user interface 510 displays the battery level of the steering wheel, the speed of the vehicle, and/or other status indications (e.g., as shown in FIGS. 7-9).

Figure 7:
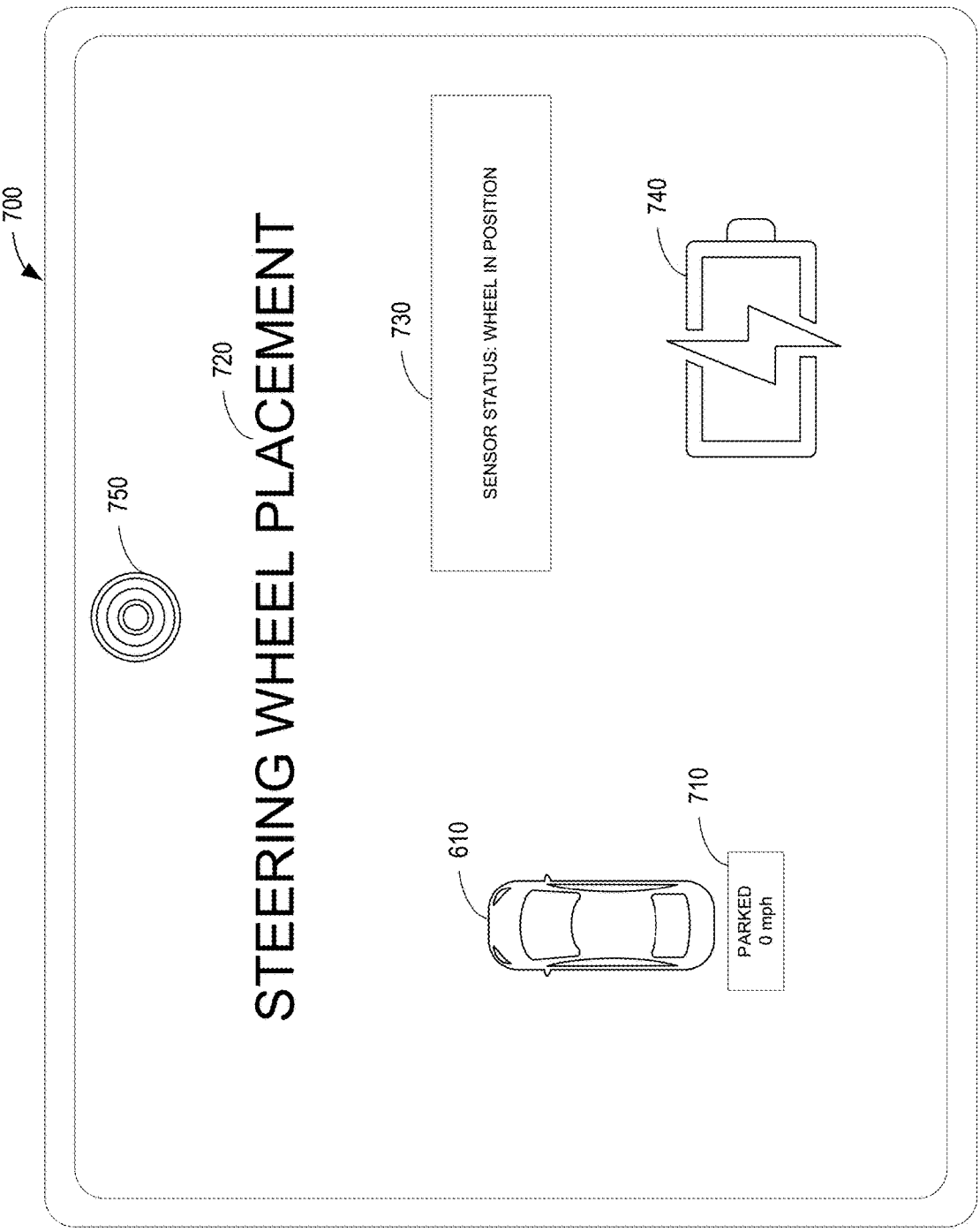
FIGS. 7-10 are an example user interface display during various phases of engaging and removing the steering wheel of FIG. 1.

FIG. 7 is an example display 700 to be displayed via the user interface 510 during placement of a steering wheel (e.g., the steering wheel frame 520) in the vehicle 610. In this example, the display 700 displays the vehicle 610 and the example status 710 of the vehicle 610. In this example, because the vehicle 610 is in park, the status 710 indicates that the vehicle 610 is "PARKED" and is traveling at 0 mph. Further, in this example, the vehicle 610 is in the example "STEERING WHEEL PLACEMENT" 720 phase of operation. Therefore, the display 700 displays the example status 730 of the sensors (e.g., the position sensors 240, 242, 244, 246, etc.) as the sensors track the steering wheel as "SENSOR STATUS: WHEEL IN POSITION." In other examples, the sensor status 730 can indicate that the steering wheel must be deposited further inside the steering column hub or other indications of the position of the steering wheel. Further, because the steering wheel is placed in the steering column hub of the vehicle 610, the steering wheel is charging in this example. The charging of the battery is indicated by the example battery status indicator 740 with a lightning bolt to represent charging. However, in other examples, the battery status indicator 740 can be presented by a percentage of battery charged, a percentage of battery remaining to be charged, a visual indication of the amount of battery charge, time until complete battery charge, and/or other indications of battery life. The display 700 includes an example camera 750 for use in user verification (as described in FIG. 9). Additionally or alternatively, other devices for user verification can be used to the camera 750 such as a fingerprint reader, an eye recognition device, or other user recognition devices.

Figure 8:
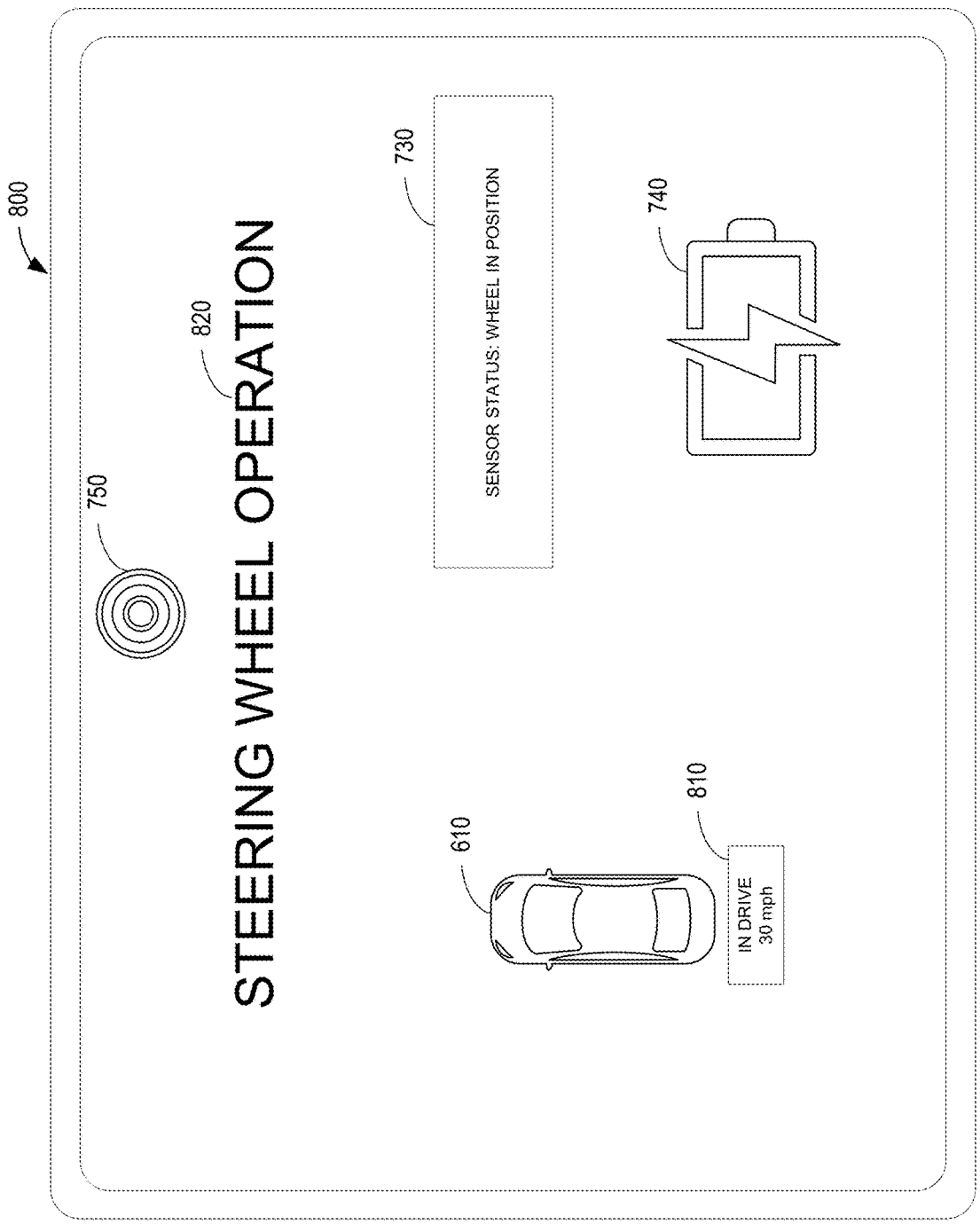

FIG. 8 is an example display 800 to be displayed via the user interface 510 during operation of the vehicle 610 after the steering wheel is attached. In this example, the display 800 displays the vehicle 610 and the example status 810 of the vehicle 610. In this example, because the vehicle 610 is in drive, the status 810 indicates that the vehicle 610 is "IN DRIVE" and is traveling at 30 mph. In this example, the steering wheel is connected, and the vehicle 610 is in drive; therefore, the steering wheel is in the example "STEERING WHEEL OPERATION" 820 phase of operation. Further, because the steering wheel is connected and the vehicle 610 is in drive, the wheel controller circuitry 110 monitors the position of the steering wheel in the steering column hub via position sensors (e.g., the position sensors 240, 242, 244, 246, etc.). In this example, the display 800 indicates the sensor status 730 as "SENSOR STATUS: WHEEL IN POSITION." Further, because the steering wheel is connected to the vehicle 610, the steering wheel is charging as indicated by the battery status indicator 740. Further, the display 800 includes the camera 750 for use in user verification (as described in FIG. 9).

Figure 9:
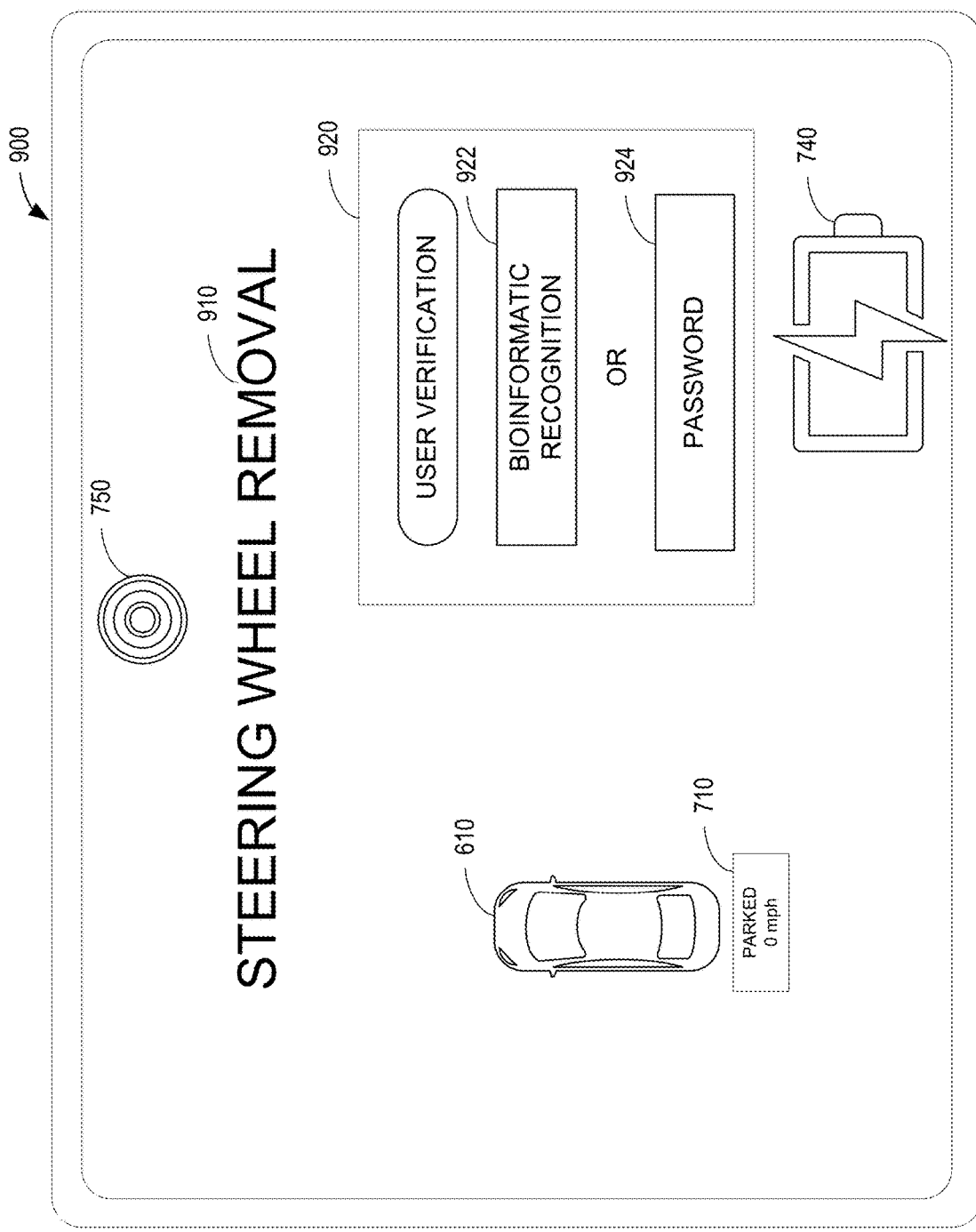

FIG. 9 is an example display 900 to be displayed via the user interface 510 during removal of the steering wheel from the vehicle 610. In this example, the display 900 displays the vehicle 610 and the example status 710 of the vehicle 610. In this example, the steering wheel is attached to the vehicle 610 and the user is in the process of removing the steering wheel. Therefore, the status 710 of the vehicle 610 indicates that the vehicle 610 is "PARKED" and is traveling at 0 mph. In this example, the steering wheel is connected, and the user has begun the process of removal; therefore, the display 900 indicates that the steering wheel is in an example "STEERING WHEEL REMOVAL" 910 phase of operation. Further, the display 900 displays an example user verification module 920 to allow the user to select between two example verification modes 922, 924. In this example, the user can select between "BIOINFORMATIC RECOGNITION" 922 or "PASSWORD" 924 for verification. In some examples, bioinformatic recognition may include facial recognition, fingerprint recognition, eye recognition, and/or other forms of biological recognition and/or monitoring (e.g., heartbeat biometrics, heart rate monitoring, etc.). However, in other examples, the user may, additionally or alternatively, be verified through aural (e.g., speech) recognition, and/or other forms of user authentication. If the user selects to use bioinformatic recognition, the camera 750 is utilized to verify the user. As noted above, in other examples, the camera 750 may be instantiated by a fingerprint reader, an eye recognition device, or other user recognition devices. As the steering wheel is connected to the vehicle 610, the battery status indicator 740 indicates that the steering wheel is charging.

Figure 10:
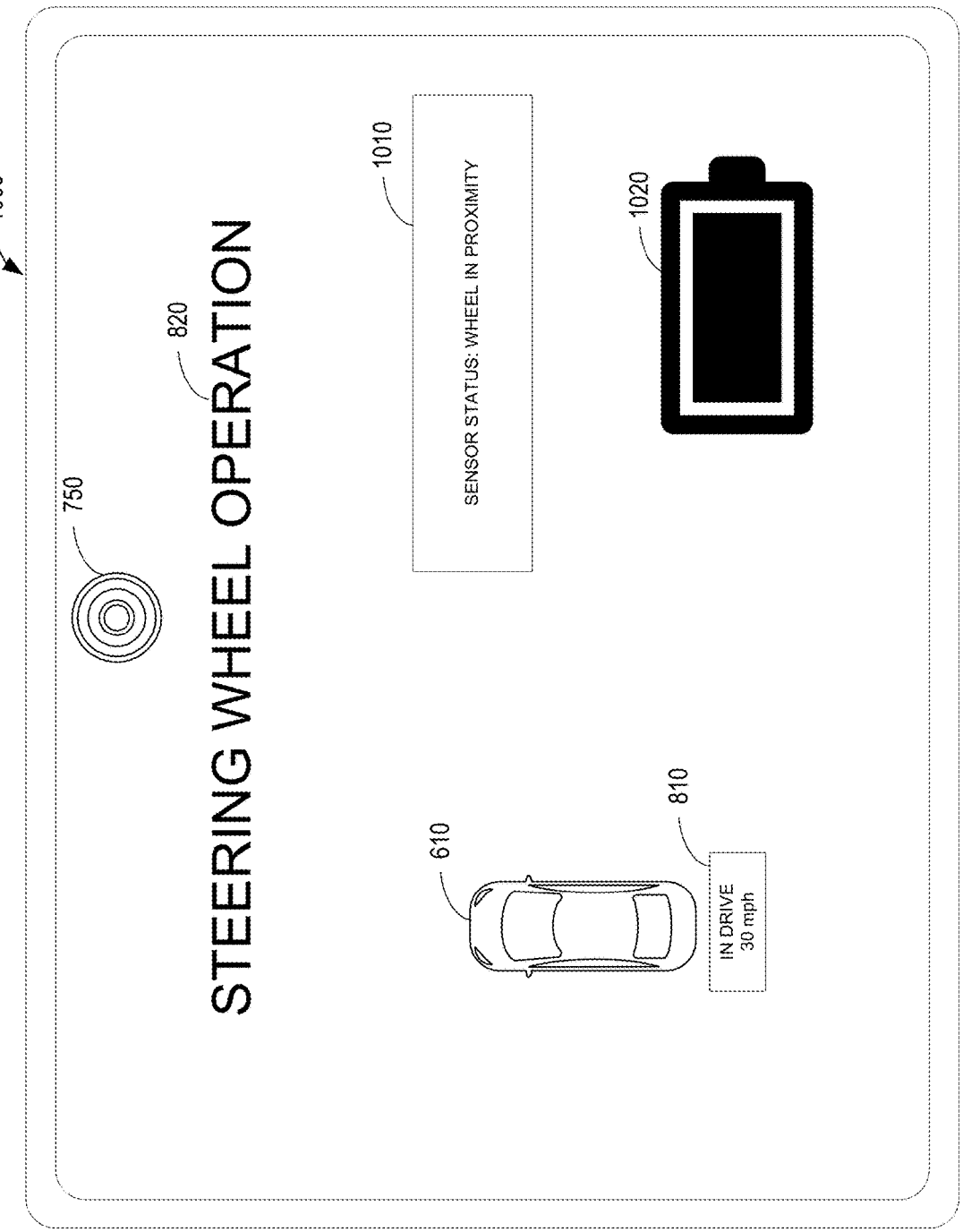

FIG. 10 is an example display 1000 of the removable steering wheel during operation of the vehicle 610 after the steering wheel is not attached. In this example, the display 1000 displays the vehicle 610 and the status 810 of the vehicle 610. In this example, the steering wheel is remotely controlling the vehicle 610; therefore, the status 810 of the vehicle 610 indicates that that the vehicle 610 is "IN DRIVE" and traveling at 30 mph. Further, because the steering wheel is remotely controlling operation of the vehicle 610, the display 1000 indicates that the steering wheel is in operation by the indication "STEERING WHEEL OPERATION" 820. Because the steering wheel is not connected to the vehicle 610 in this example, an example sensor status 1010 indicates that the wheel controller circuitry 110 continues to track the steering wheel using the position sensors (e.g., the location sensor 108, etc.) through the sensor status 1010 notification that the "SENSOR STATUS: WHEEL IN PROXIMITY." In some examples, if the steering wheel is moved out of range of the sensors of the vehicle 610, the display 1000 indicates that the steering wheel is out of range and no longer controls the vehicle 610. Because the steering wheel is not connected to the vehicle, an example battery status indicator 1020 displays to the user the amount of charge remaining in the battery. In this example, the battery status indicator 1020 displays battery life visually with an icon of a battery. However, in other examples, the battery status indicator 1020 can, additionally or alternatively, include the percentage of battery life remaining, the time remaining of operation, and/or the time until a certain percentage of battery life remains (e.g., time until the battery reaches 10% remaining, etc.). Further, the steering wheel user interface 1000 includes the camera 750 for use in user identification (as described in FIG. 9).

Figure 11:
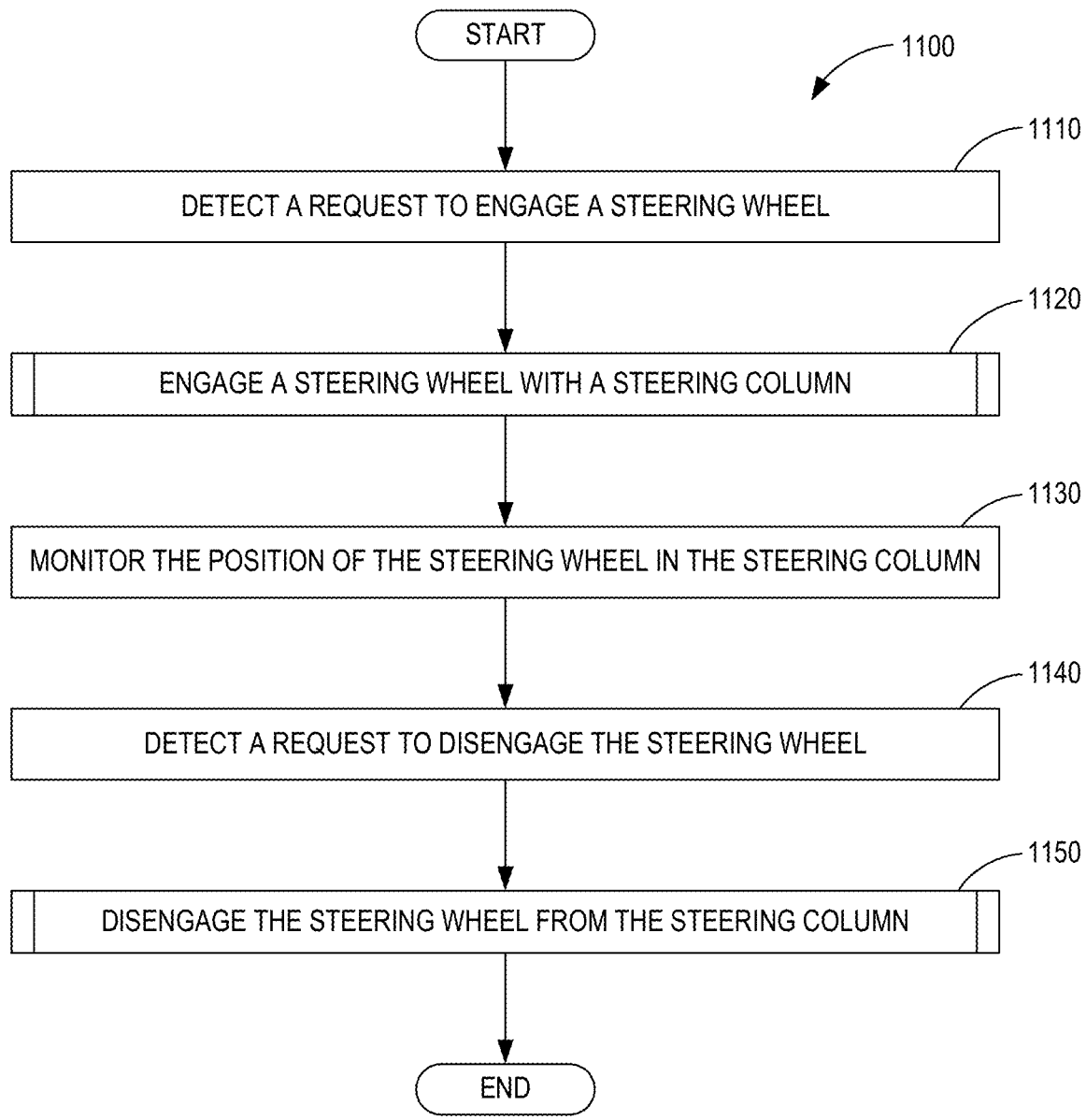
FIGS. 11-13 are flowcharts representative of example machine readable instructions and/or example operations that may be executed, instantiated, and/or performed by example programmable circuitry to implement the wheel controller circuitry of FIG. 3.
Figure 12:
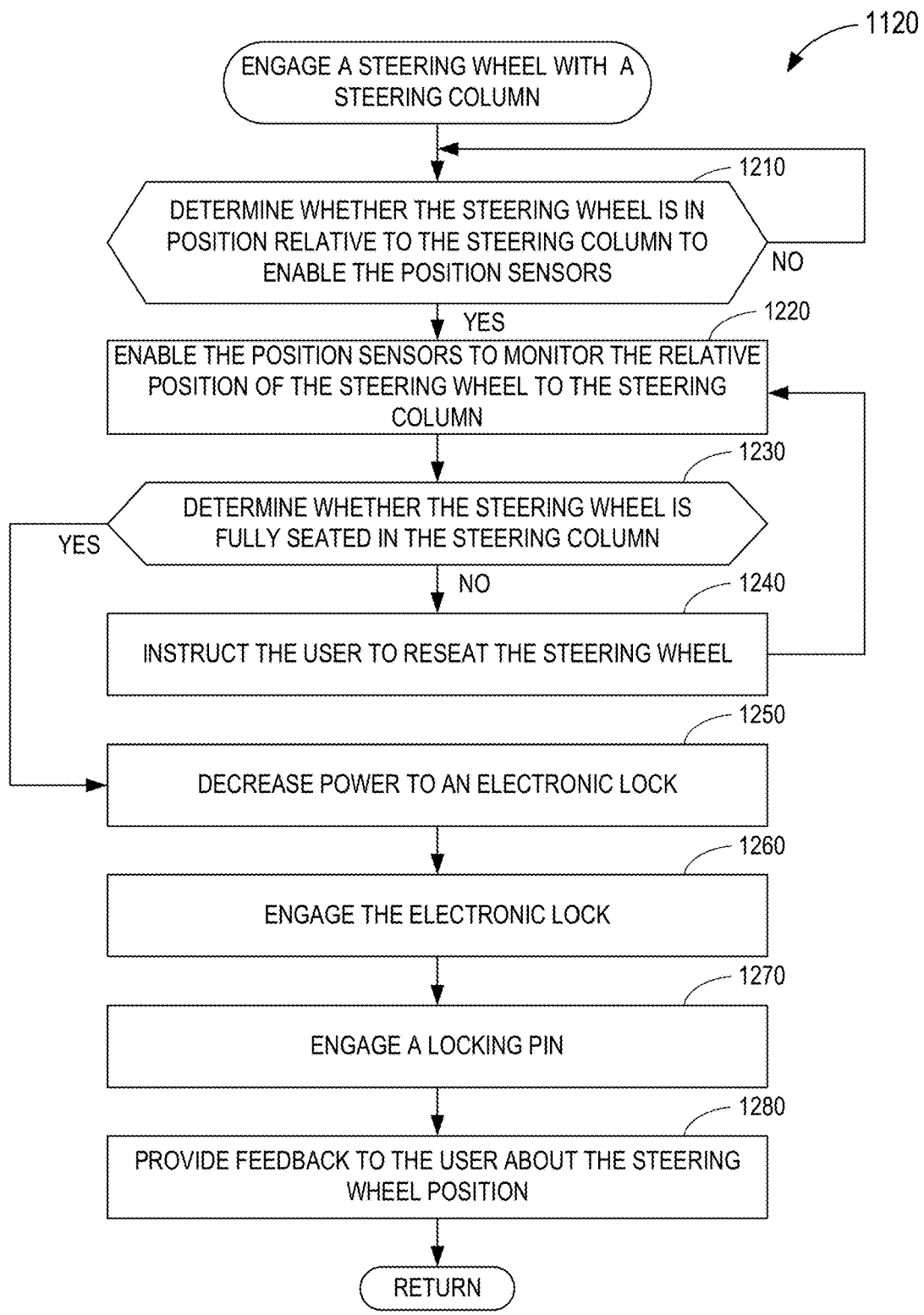
Figure 13:
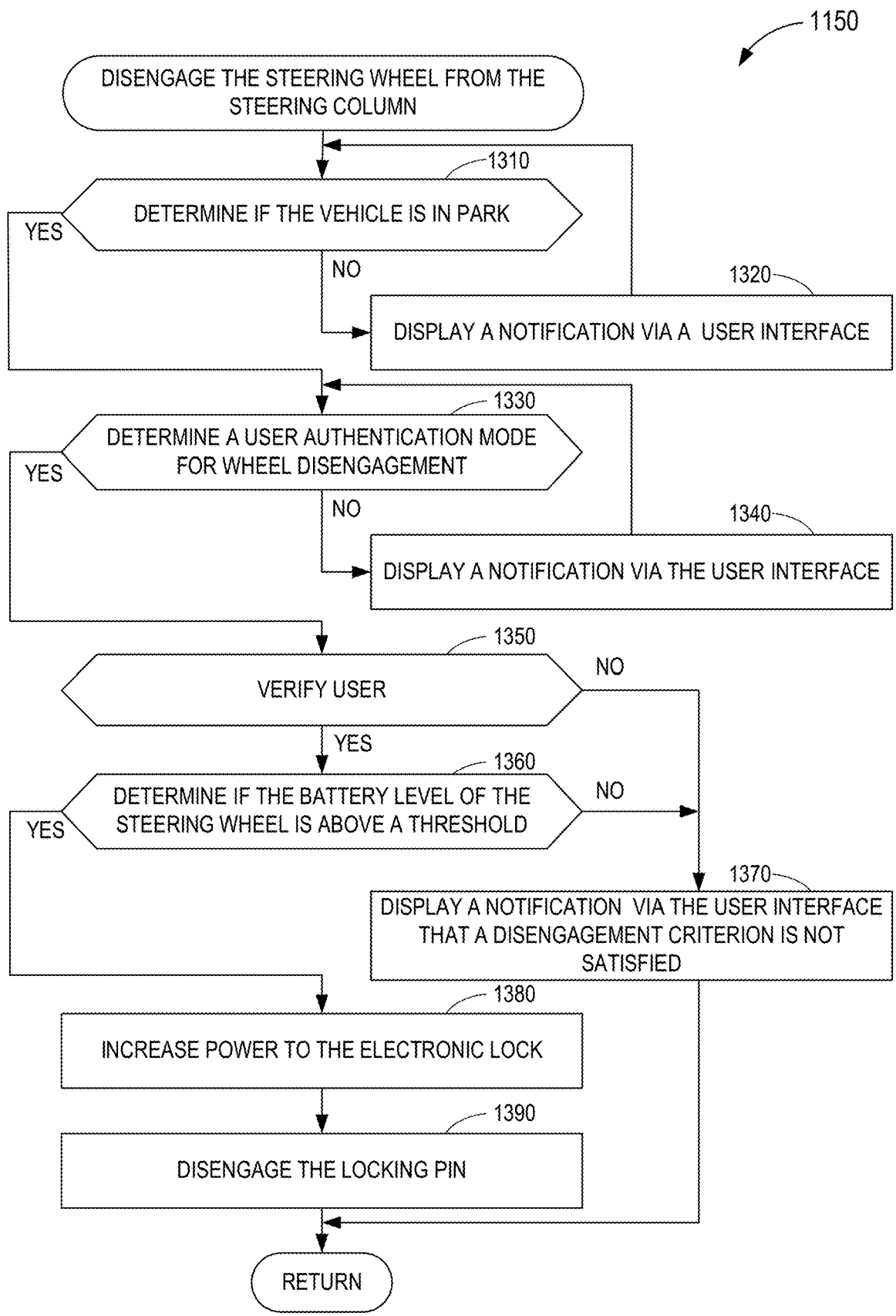

Flowcharts representative of example machine readable instructions, which may be executed by programmable circuitry to implement and/or instantiate the wheel controller circuitry 110 of FIG. 3 and/or representative of example operations which may be performed by programmable circuitry to implement and/or instantiate the wheel controller circuitry 110 of FIG. 3, are shown in FIGS. 11-13. The machine readable instructions may be one or more executable programs or portion(s) of one or more executable programs for execution by programmable circuitry such as the programmable circuitry 1412 shown in the example processor platform 1300 discussed below in connection with FIG. 13 and/or may be one or more function(s) or portion(s) of functions to be performed by the example programmable circuitry (e.g., an FPGA). In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 11-13, many other methods of implementing the example wheel controller circuitry 110 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming user interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 11-13 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 11 is a flowchart representative of example machine readable instructions and/or example operations 1100 that may be executed, instantiated, and/or performed by programmable circuitry to engage and disengage the removable steering wheel with the vehicle. The example machine-readable instructions and/or the example operations 1100 of FIG. 11 begin at block 1110, at which the request detection circuitry 320 detects a request to engage a steering wheel. A request to engage the steering wheel includes the user selecting via the user interface to place the steering wheel in the steering column hub of the vehicle, the user placing the steering wheel in the steering column hub of the vehicle, and/or the user bringing the steering wheel in proximity to the vehicle. In some examples, at block 1110, the steering wheel position determiner circuitry 310 can determine the position of the steering wheel as within a threshold distance from the vehicle to enable the identification of a request to engage the steering wheel. After a request to engage the steering wheel is detected by the request detection circuitry 320, the steering wheel shaft position determiner circuitry 310, at block 1120, engages the steering wheel with the steering column hub. Then, at block 1130, the steering wheel shaft position determiner circuitry 310 monitors the position of the steering wheel in the steering column hub. In some examples, the steering wheel shaft position determiner circuitry 310 monitors if the steering wheel dislodges from the steering column hub and/or whether the steering wheel moves a threshold amount from the fully seated position in the steering column hub. At block 1140, the request detection circuitry 320 detects a request to disengage the steering wheel. In some examples, a request to disengage the steering wheel includes the user selecting via the user interface to remove the steering wheel from the steering column hub of the vehicle, the user attempting to remove the steering wheel from the steering column hub of the vehicle, and/or the user beginning to exit the vehicle. After detecting a request to disengage the steering wheel, the lock position determiner circuitry 370, at block 1150, disengages the steering wheel from the steering column hub.

FIG. 12 is a flowchart representative of example machine readable instructions and/or example operations 1120 that may be executed, instantiated, and/or performed by programmable circuitry to engage the steering wheel with the steering column hub. The example machine-readable instructions and/or the example operations 1120 of FIG. 12 begin at block 1210, at which the steering wheel shaft position determiner circuitry 350 determines whether the steering wheel is in position relative to the steering column hub to engage the position sensors (e.g., the position sensors 240, 242, 244, 246, etc.). In some examples, the position sensors engage after the steering wheel shaft is 75% seated into the steering column hub, the position sensors engage upon contact of the steering wheel shaft with the steering column hub, and/or the position sensors engage after another predetermined event. If the steering wheel shaft position determiner circuitry 350 determines that the steering wheel is not in position relative to the steering column hub to engage the position sensors (block 1210: NO), control returns to block 1210 to further determine whether the steering wheel is in position at a later time. However, if the steering wheel shaft position determiner circuitry 350 determines the steering wheel is in position relative to the steering column hub to engage the position sensors (block 1210: YES), control proceeds to block 1220. At block 1220, the steering wheel shaft position determiner circuitry 350 uses the position sensors to monitor the relative position of the steering wheel to the steering column hub. Then, at block 1230, the steering wheel shaft position determiner circuitry 350 determines whether the steering wheel is fully seated in the steering column hub. If the steering wheel is not fully seated in the steering column hub (block 1230: NO), the steering wheel position determiner circuitry 310, at block 1240, instructs the user to reseat the steering wheel. If the steering wheel is fully seated in the steering column hub (block 1230: YES), control proceeds to block 1250. At block 1250, the lock position determiner circuitry 370 decreases power to an electronic lock. Then, at block 1260, the lock position determiner circuitry 370 engages the electronic lock. At block 1270, the lock position determiner circuitry 370 engages a locking pin. Then, at block 1280, the feedback generator circuitry 360 provides feedback to the user about the position of the steering wheel (e.g., whether the steering wheel is fully seated in the steering column hub, etc.). After the feedback generator circuitry 360 provides feedback to the user about the position of the steering wheel, control returns to block 1130 of FIG. 11.

FIG. 13 is a flowchart representative of example machine readable instructions and/or example operations 1150 that may be executed, instantiated, and/or performed by programmable circuitry to disengage the steering wheel with the steering column hub. The example machine-readable instructions and/or the example operations 1150 of FIG. 13 begin at block 1310, at which the vehicle condition determiner circuitry 380 determines if the vehicle is in park. If the vehicle condition determiner circuitry 380 determines that the vehicle is not in park (e.g., the vehicle is traveling at a speed above 0 mph and/or the parking gear is not activated) (block 1310: NO), control proceeds to block 1320. At block 1320, the feedback generator circuitry 360 displays a notification via the user interface. In some examples, the notification indicates to the user that the vehicle is not in park or that the user must place the vehicle in park to proceed. After a notification is displayed via the user interface, control proceeds to block 1310. However, if the vehicle condition determiner circuitry 380 determines that the vehicle is in park (e.g., that the vehicle is traveling at 0 mph and the parking gear has been activated) (block 1310: YES), control proceeds to block 1330. At block 1330, the user verification circuitry 330 determines a user authentication mode for wheel disengagement. If a user authentication mode is not determined by the user verification circuitry 330 (e.g., a user authentication mode is not selected by a user, a default user authentication mode is not available, etc.) (block 1330: NO), control proceeds to block 1340. At block 1340, the feedback generator circuitry 360 displays a notification via the user interface. The notification may communicate to the user that a user authentication mode must be selected to proceed. After a notification is displayed via the user interface, control proceeds to block 1330. However, if the user verification circuitry 330 determines a user authentication mode for wheel disengagement (e.g., a user authentication mode is selected by a user, a default user authentication mode is available, etc.) (block 1330: YES), control proceeds to block 1350. At block 1350, the user verification circuitry 330 verifies the user. In some examples, user verification is instantiated via facial, aural (e.g., speech), bioinformatic (e.g., facial image, fingerprint, eye image, heartbeat), and/or password recognition. If the user verification circuitry 330 cannot verify the user (e.g., the user input does not correspond to a user profile stored in the database 390, etc.) (block 1350: NO), control proceeds to block 1370 where the feedback generator circuitry 370 displays a notification that a disengagement criterion is not satisfied. If the user verification circuitry 330 successfully verifies the user (e.g., the user input corresponds to a user profile stored in the database 390, etc.) (block 1350: YES), the charge detection circuitry 340, at block 1360, determines if the battery level of the steering wheel is above a threshold. If the charge detection circuitry 340 determines that the battery level of the steering wheel is not above a threshold (block 1360: NO), control proceeds to block 1370 where the feedback generator circuitry 360 displays a notification that a disengagement criterion is not satisfied. In some examples, the threshold battery level of the steering wheel can be a specified percentage and/or time remaining of wireless operation. In some examples, the notification displayed at block 1370 by the feedback generator circuitry 360 additionally instructs the user to charge the steering wheel to a threshold level before removal and/or instructs the user of time until the steering wheel may be removed. After the feedback generator circuitry 360 displays the notification that a disengagement criterion is not satisfied at block 1370, control returns to block 1150 of FIG. 11. However, if the charge detection circuitry 340 determines that the battery level of the steering wheel is above a threshold (block 1360: YES), control proceeds to block 1380. At block 1380, the lock position determiner circuitry 370 increases power to the electronic lock. Then, because of the increased power to the electronic lock, the lock position determiner circuitry 370, at block 1390, disengages the locking pin. After the locking pin is disengaged, control returns to block 1150 of FIG. 11.

Figure 14:
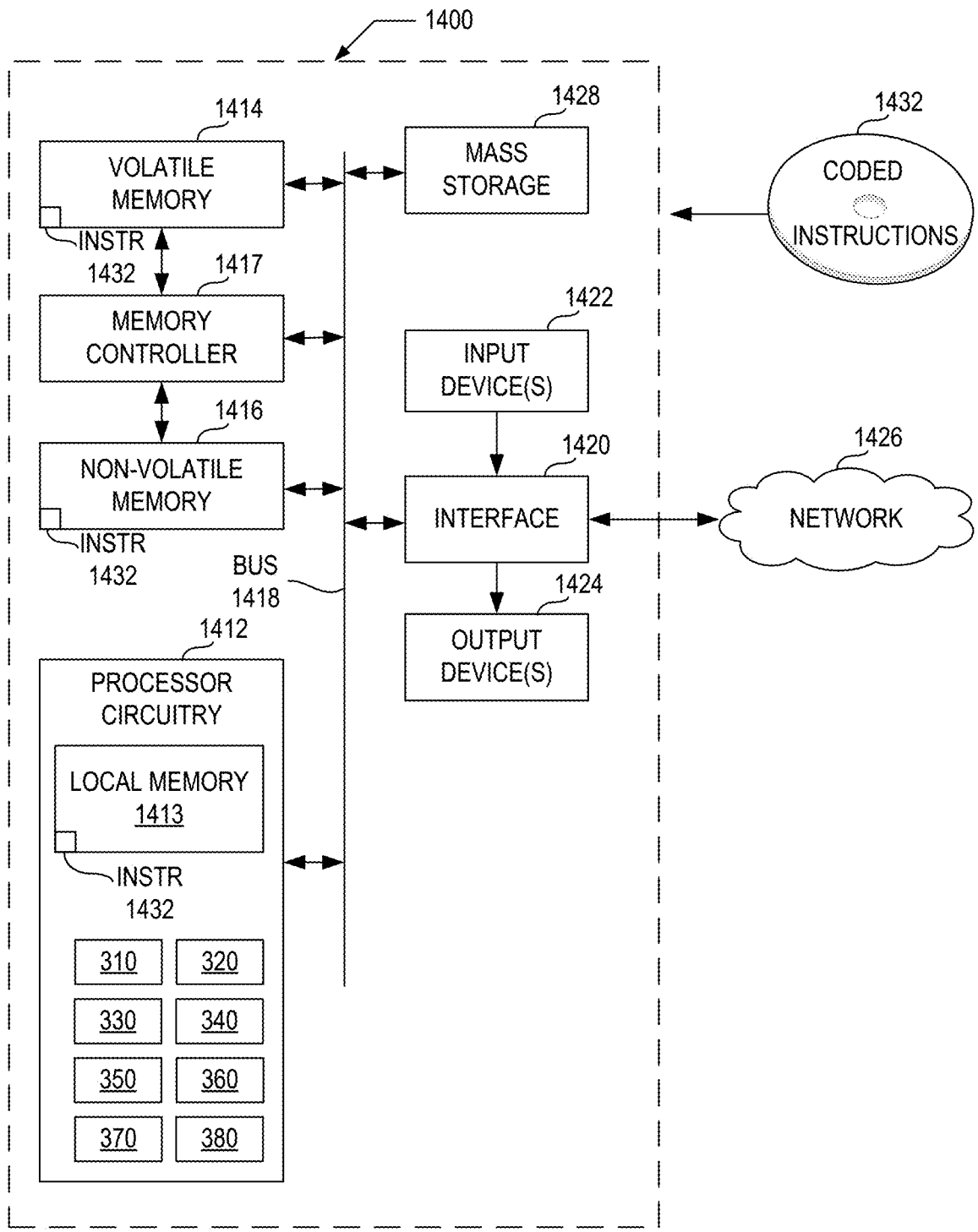
FIG. 14 is a block diagram of an example processing platform including programmable circuitry structured to execute, instantiate, and/or perform the example machine readable instructions and/or perform the example operations of FIGS. 11-13 to implement the wheel controller circuitry of FIG. 3.

FIG. 14 is a block diagram of an example programmable circuitry platform 1400 structured to execute and/or instantiate the example machine-readable instructions and/or the example operations of FIGS. 11-13 to implement the wheel controller circuitry of FIG. 3. The programmable circuitry platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1400 of the illustrated example includes programmable circuitry 1412. The programmable circuitry 1412 of the illustrated example is hardware. For example, the programmable circuitry 1412 can be implemented by one or more integrated circuits, logic circuits, FPGAs, microprocessors, CPUs, GPUs, DSPs, and/or microcontrollers from any desired family or manufacturer. The programmable circuitry 1412 may be implemented by one or more semiconductor based (e.g., silicon based) devices. In this example, the programmable circuitry 1412 implements the steering wheel position determiner circuitry 310, the request detection circuitry 320, the user verification circuitry 330, the charge detection circuitry 340, the steering wheel shaft position determiner circuitry 350, and the feedback generator circuitry 360.

The programmable circuitry 1412 of the illustrated example includes a local memory 1413 (e.g., a cache, registers, etc.). The programmable circuitry 1412 of the illustrated example is in communication with main memory 1414, 1416, which includes a volatile memory 1414 and a non-volatile memory 1416, by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417. In some examples, the memory controller 1417 may be implemented by one or more integrated circuits, logic circuits, microcontrollers from any desired family or manufacturer, or any other type of circuitry to manage the flow of data going to and from the main memory 1414, 1416.

The programmable circuitry platform 1400 of the illustrated example also includes user interface circuitry 1420. The user interface circuitry 1420 may be implemented by hardware in accordance with any type of user interface standard, such as an Ethernet user interface, a universal serial bus (USB) user interface, a Bluetooth® user interface, a near field communication (NFC) user interface, a Peripheral Component Interconnect (PCI) user interface, and/or a Peripheral Component Interconnect Express (PCIe) user interface.

In the illustrated example, one or more input devices 1422 are connected to the user interface circuitry 1420. The input device(s) 1422 permit(s) a user (e.g., a human user, a machine user, etc.) to enter data and/or commands into the programmable circuitry 1412. The input device(s) 1422 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1424 are also connected to the user interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The user interface circuitry 1420 of the illustrated example, thus, typically includes a graphics driver card, a graphics driver chip, and/or graphics processor circuitry such as a GPU.

The user interface circuitry 1420 of the illustrated example also includes a communication device such as a transmitter, a receiver, a transceiver, a modem, a residential gateway, a wireless access point, and/or a network user interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1400 of the illustrated example also includes one or more mass storage discs or devices 1428 to store firmware, software, and/or data. Examples of such mass storage discs or devices 1428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1432, which may be implemented by the machine readable instructions of FIGS. 11-13, may be stored in the mass storage device 1428, in the volatile memory 1414, in the non-volatile memory 1416, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming user interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that monitor and enable the removal of a steering wheel from a vehicle. Disclosed systems, apparatus, articles of manufacture, and methods improve the efficiency of using a computing device by monitoring and enabling the removal of a steering wheel from a vehicle. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to remove steering wheels of vehicles are disclosed herein. Further examples and combinations thereof include the following:

Example 1 includes a method to remove a steering wheel of a vehicle, the method comprising detecting a request to remove a steering wheel from a steering system of a vehicle, verifying a user identity based on a user profile, the user profile stored in a memory associated with the vehicle, determining whether a disengagement criterion is satisfied, and after the user identity is verified and the disengagement criterion is satisfied, disengaging a lock to enable removal of the steering wheel from the steering system of the vehicle.

Example 2 includes the method of example 1, wherein determining whether the disengagement criterion is satisfied includes determining whether the vehicle is stationary based on a speed of the vehicle.

Example 3 includes the method of example 1, wherein verifying the user identity is based on a user input.

Example 4 includes the method of example 3, wherein the user input includes at least one of a password, a facial image, speech, a fingerprint, a heartbeat, or an eye image.

Example 5 includes the method of example 3, wherein a user interface is located on the steering wheel, the user interface to receive the user input.

Example 6 includes the method of example 1, wherein determining whether the disengagement criterion is satisfied includes determining whether a battery of the steering wheel has a charge above a threshold.

Example 7 includes the method of example 1, wherein disengaging the lock includes interfacing with a solenoid of the lock to actuate a pin of the lock disposed within the solenoid.

Example 8 includes a non-transitory computer-readable medium comprising instructions which, when executed, cause processor circuitry of a vehicle to detect a request to remove a steering wheel from a steering system of a vehicle, verify a user identity based on a user profile, the user profile stored in a memory associated with the vehicle, determine whether a disengagement criterion is satisfied, and after the user identity is detected and the disengagement criterion is satisfied, disengage a lock to enable removal of the steering wheel from the steering system of the vehicle.

Example 9 includes the non-transitory computer-readable medium of example 8, wherein the transitory computer-readable medium is to execute the instruction to determine whether the disengagement criterion is satisfied by determining whether the vehicle is stationary based on a speed of the vehicle.

Example 10 includes the non-transitory computer-readable medium of example 8, herein the transitory computer-readable medium is to execute the instruction to verify the user identity based on a user input.

Example 11 includes the non-transitory computer-readable medium of example 10, wherein the user input includes at least one of a password, a facial image, speech, a fingerprint, a heartbeat, or an eye image.

Example 12 includes the non-transitory computer-readable medium of example 8, wherein a user interface is located on the steering wheel, the user interface to receive a user input.

Example 13 includes the non-transitory computer-readable medium of example 8, wherein the transitory computer-readable medium is to execute the instruction to determine whether the disengagement criterion is satisfied by determining whether a battery of the steering wheel has a charge above a threshold.

Example 14 includes the non-transitory computer-readable medium of example 8, wherein the transitory computer-readable medium is to execute the instruction to disengage the lock by interfacing with a solenoid of the lock to actuate a pin of the lock disposed within the solenoid.

Example 15 includes a steering wheel system to remove a steering wheel of a vehicle, comprising a steering wheel shaft including a first opening, a steering wheel coupled to the steering wheel shaft, a steering column hub including a second opening, a first sensor located on at least one of the steering wheel shaft or the steering column hub, a second sensor located on at least one of the steering wheel shaft or the steering column hub, an electronic lock to couple the steering wheel shaft to the steering column hub, the electronic lock moveable between a closed position and an open position, the electronic lock including a pin, the pin to extend through the first opening and the second opening in the closed position, and circuitry to determine the first opening is aligned with the second opening based on a first output of the first sensor and a second output of the second sensor, and move the electronic lock to the closed position after determining the first opening is aligned with the second opening.

Example 16 includes the steering wheel system of example 15, wherein the steering wheel shaft includes first grooves, the steering column hub has an inner surface to include second grooves, and a shape of the second grooves to mate with a shape of the first grooves.

Example 17 includes the steering wheel system of example 15, wherein the first output is indicative of a relative position of the steering wheel shaft and the steering column hub and the second output is indicative of the relative position.

Example 18 includes the steering wheel system of example 15, further including a third sensor in the steering wheel to monitor the location of the steering wheel in relation to the vehicle via a wireless connection between the steering wheel and the vehicle.

Example 19 includes the steering wheel system of example 18, wherein a third output from the third sensor determines whether the steering wheel is in position to operate the vehicle.

Example 20 includes the steering wheel system of example 15, further including a camera on the vehicle to determine the location of the steering wheel in relation to the vehicle.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A method to remove a steering wheel of a vehicle, the method comprising:
   detecting a request to remove a steering wheel from a steering system of a vehicle;
   verifying a user identity based on a user profile, the user profile stored in a memory associated with the vehicle;
   determining whether a disengagement criterion is satisfied; and
   after the user identity is verified and the disengagement criterion is satisfied, disengaging a lock to enable removal of the steering wheel from the steering system of the vehicle.

2. The method of claim 1, wherein determining whether the disengagement criterion is satisfied includes determining whether the vehicle is stationary based on a speed of the vehicle.

3. The method of claim 1, wherein verifying the user identity is based on a user input.

4. The method of claim 3, wherein the user input includes at least one of a password, a facial image, speech, a fingerprint, a heartbeat, or an eye image.

5. The method of claim 3, wherein a user interface is located on the steering wheel, the user interface to receive the user input.

6. The method of claim 1, wherein determining whether the disengagement criterion is satisfied includes determining whether a battery of the steering wheel has a charge above a threshold.

7. The method of claim 1, wherein disengaging the lock includes interfacing with a solenoid of the lock to actuate a pin of the lock disposed within the solenoid.

8. A non-transitory computer-readable medium comprising instructions which, when executed, cause processor circuitry of a vehicle to:
   detect a request to remove a steering wheel from a steering system of a vehicle;
   verify a user identity based on a user profile, the user profile stored in a memory associated with the vehicle;
   determine whether a disengagement criterion is satisfied; and
   after the user identity is detected and the disengagement criterion is satisfied, disengage a lock to enable removal of the steering wheel from the steering system of the vehicle.

9. The non-transitory computer-readable medium of claim 8, wherein the non-transitory computer-readable medium is to execute the instruction to determine whether the disengagement criterion is satisfied by determining whether the vehicle is stationary based on a speed of the vehicle.

10. The non-transitory computer-readable medium of claim 8, wherein the non-transitory computer-readable medium is to execute the instruction to verify the user identity based on a user input.

11. The non-transitory computer-readable medium of claim 10, wherein the user input includes at least one of a password, a facial image, speech, a fingerprint, a heartbeat, or an eye image.

12. The non-transitory computer-readable medium of claim 8, wherein a user interface is located on the steering wheel, the user interface to receive a user input.

13. The non-transitory computer-readable medium of claim 8, wherein the non-transitory computer-readable medium is to execute the instruction to determine whether the disengagement criterion is satisfied by determining whether a battery of the steering wheel has a charge above a threshold.

14. The non-transitory computer-readable medium of claim 8, wherein the non-transitory computer-readable medium is to execute the instruction to disengage the lock by interfacing with a solenoid of the lock to actuate a pin of the lock disposed within the solenoid.

15. A steering wheel system to remove a steering wheel of a vehicle, comprising:
- a steering wheel shaft including a first opening;
- a steering wheel coupled to the steering wheel shaft;
- a steering column hub including a second opening;
- a first sensor located on at least one of the steering wheel shaft or the steering column hub;
- a second sensor located on at least one of the steering wheel shaft or the steering column hub;
- an electronic lock to couple the steering wheel shaft to the steering column hub, the electronic lock moveable between a closed position and an open position, the electronic lock including a pin, the pin to extend through the first opening and the second opening in the closed position; and
- circuitry to:
   - determine the first opening is aligned with the second opening based on a first output of the first sensor and a second output of the second sensor; and
   - move the electronic lock to the closed position after determining the first opening is aligned with the second opening.

16. The steering wheel system of claim 15, wherein the steering wheel shaft includes first grooves, the steering column hub has an inner surface to include second grooves, and a shape of the second grooves to mate with a shape of the first grooves.

17. The steering wheel system of claim 15, wherein the first output is indicative of a relative position of the steering wheel shaft and the steering column hub and the second output is indicative of the relative position.

18. The steering wheel system of claim 15, further including a third sensor in the steering wheel to monitor the location of the steering wheel in relation to the vehicle via a wireless connection between the steering wheel and the vehicle.

19. The steering wheel system of claim 18, wherein a third output from the third sensor determines whether the steering wheel is in position to operate the vehicle.

20. The steering wheel system of claim 15, further including a camera on the vehicle to determine the location of the steering wheel in relation to the vehicle.

* * * * *